(12) United States Patent
Wang

(10) Patent No.: US 10,122,295 B2
(45) Date of Patent: Nov. 6, 2018

(54) SELF-EXCITATION PUSH-PULL TYPE CONVERTER

(75) Inventor: Baojun Wang, Guangzhou (CN)

(73) Assignee: MORNSUN GUANGZHOU SCIENCE & TECHNOLOGY LTD., Guangdong (CN)

( * ) Notice: Subject to any disclaimer, the term of this patent is extended or adjusted under 35 U.S.C. 154(b) by 293 days.

(21) Appl. No.: 14/357,209

(22) PCT Filed: Apr. 12, 2012

(86) PCT No.: PCT/CN2012/073867
§ 371 (c)(1),
(2), (4) Date: May 8, 2014

(87) PCT Pub. No.: WO2013/091323
PCT Pub. Date: Jun. 27, 2013

(65) Prior Publication Data
US 2014/0313805 A1    Oct. 23, 2014

(30) Foreign Application Priority Data
Dec. 22, 2011 (CN) .......................... 2011 1 0436259

(51) Int. Cl.
H02M 7/538 (2007.01)
H02M 3/338 (2006.01)
H01F 3/14 (2006.01)
H01F 30/16 (2006.01)

(52) U.S. Cl.
CPC .............. *H02M 7/538* (2013.01); *H01F 3/14* (2013.01); *H02M 3/3384* (2013.01); *H01F 30/16* (2013.01)

(58) Field of Classification Search
CPC ..................................................... H02M 7/538
USPC ................................................ 363/133, 132
See application file for complete search history.

(56) References Cited

U.S. PATENT DOCUMENTS

| | | | | |
|---|---|---|---|---|
| 2,802,182 | A * | 8/1957 | Godshalk | G01N 27/06 324/117 R |
| 3,812,428 | A * | 5/1974 | Trenkler | G01R 19/20 324/117 R |
| 4,156,882 | A * | 5/1979 | Delagi | G11B 5/10 360/125.33 |
| 4,969,078 | A * | 11/1990 | Yamamoto | H02M 3/3378 336/178 |
| 5,327,337 | A * | 7/1994 | Cripe | H02M 3/3372 363/134 |
| 5,548,502 | A * | 8/1996 | Kosugi | H02M 3/337 363/133 |

(Continued)

*Primary Examiner* — Paresh H Patel
(74) *Attorney, Agent, or Firm* — JCIPRNET

(57) ABSTRACT

A self-excitation push-pull type converter with a transformer having a closed magnetic core or iron core, which formed of a main part (52) and a local part (53). The local part reaches magnetic saturation earlier than the main part under the same increasing magnetic field excitation. When the self-excitation push-pull type converter is in a light load state, the efficiency is significantly improved, and further improved in a rated load state. As the number of turns of the coil on the magnetic saturation transformer is reduced, the working frequency of the converter increases while still keeping the loss low. The probability of generating a current peak at the moments of switching on or off is reduced, thereby further improving the efficiency and reducing output ripples.

11 Claims, 10 Drawing Sheets

(56) References Cited

U.S. PATENT DOCUMENTS

| | | | | |
|---|---|---|---|---|
| 5,734,264 A | * | 3/1998 | Berna | G01R 15/185 |
| | | | | 324/117 H |
| 6,693,804 B2 | * | 2/2004 | Suzuki | H02M 1/12 |
| | | | | 363/134 |
| 7,084,617 B2 | * | 8/2006 | Ozaki | G01R 15/202 |
| | | | | 324/117 H |
| 8,810,335 B2 | * | 8/2014 | Ichihara | H01F 27/38 |
| | | | | 333/177 |

* cited by examiner

SELF-EXCITATION PUSH-PULL TYPE CONVERTER

CROSS-REFERENCE TO RELATED APPLICATIONS

This application claims priority from CN Application No. 201110436259.7, filed Dec. 22, 2011 and PCT Application No. PCT/CN2012/073867, filed Apr. 12, 2012, the contents of which are incorporated herein in the entirety by reference.

FIELD OF THE INVENTION

This invention is related to switching power, especially switching power of self-excitation push-pull type converter.

BACKGROUND OF THE INVENTION

In the existing self-excitation push-pull type converters, their circuit structure is based on the DC converter of self-excitation push-pull transistor single transformer invented by G. H. Royer in the United States in 1955, it is also referred to as Royer circuit, which is the start to realize high frequency conversion control circuit; some circuits are based on the self-excitation push-pull dual transformer circuit of Jensen of the United States in 1957, which was later known as self-oscillating Jensen circuit or Jensen circuit; both of these circuits were later referred to as self-excitation push-pull converter. The working principle of the self-excitation push-pull converter is described on pp. 67~70 of *Principle and design of switching power source* published by the Electronic Industry Press, the ISBN No. of the book is 7-121-00211-6. The circuits are mainly in the forms of the above-mentioned famous Royer circuit and self-oscillating Jensen circuit.

Shown in FIG. 1-1 is a common application of the self-excitation push-pull converter, it is based on Royer circuit; shown in FIG. 1-2 is the famous self-oscillating Jensen circuit; in FIG. 1-1 and FIG. 1-2, the circuits oscillate by using the magnetic core saturation characteristics of transformer B1, in the Jensen circuit of FIG. 1-2, the self-oscillating frequency and drive function of the circuit is realized by the magnetic saturated transformer B1, therefore, the main power transformer B2 can work in a non-saturated state.

The oscillation frequency of the Royer circuit is a function of the power source voltage, which is described in Line 18 on p. 68 of *Principle and design of switching power source* published by the Electronic Industry Press, the ISBN No. of the book is 7-121-00211-6. It is quoted as follows:

$$f = \frac{V_S}{4BwSN} \times 10^4 \text{ Hz} \qquad \text{Formula (1)}$$

where: f is the oscillation frequency; Bw the working magnetic induction intensity (T), normally taken as 50%~70% of the magnetic saturation point $B_m$ value; N is the No. of coil turns; S the magnetic core effective sectional area; and $V_S$ the working power source voltage.

To better understand the working principle of the Royer circuit, especially the oscillation with magnetic core saturation characteristics, its working principle is described with FIG. 1-1 as an example.

The circuit in FIG. 1-1 is in such a structure: the input filtering capacity C is connected between the voltage input and ground, to filter the input voltage; the input voltage after filtration is connected to the start circuit, which is formed by the shunted biasing resistor R1 and capacitor C1, the two ends of the biasing resistor R1 are respectively connected with the voltage input and the central taps of the primary side coils $N_{B1}$ and $N_{B2}$ of transformer B1 which provides positive feedback to the bases of the two push-pull transistor TR1 and TR2, the emitters of the two push-pull transistor TR1 and TR2 share a ground, the two collectors are respectively connected to the two ends of the transformer primary side coils $N_{P1}$ and $N_{P2}$, the bases are connected to the two ends of the transformer primary side coils $N_{B1}$ and $N_{B2}$, and the central tap in the primary side coils $N_{P1}$ and $N_{P2}$ are connected to the voltage input; the secondary side coil NS of transformer B1 connects the output circuit to the voltage output.

The working principle can be briefly described as: refer to FIG. 1-1, at the moment when the power is turned on, the shunted circuit of biasing resistor R1 and capacitor C1 provides a forward bias for the base and emitter of the transistors TR1 and TR2 via windings $N_{B1}$ and $N_{B2}$, the two transistors TR1 and TR2 start to conduct. As the characteristics of the two transistor cannot be completely the same, one of them will become conducting first, suppose transistor TR2 becomes conducting first, and produces the collector current IC2, the voltage in the corresponding $N_{P2}$ winding is positive at the top and negative at the bottom, according to the dotted terminal relationship, an induced voltage positive at the top and negative at the bottom will also appear at its base coil $N_{B2}$, this voltage increases the base current of transistor TR2, which is a forward feedback process, therefore it quickly makes transistor TR2 saturated and conducting. Similarly, the voltage of the coil $N_{B1}$ corresponding to transistor TR1 is positive at the top and negative at the bottom, and it reduces the base current of transistor TR1, so that this transistor is soon completely cut off.

The current in coil $N_{P2}$ winding corresponding to transistor TR2 and the magnetic induction intensity produced by this current increases linearly with time, but when the magnetic induction intensity increases to approach or reach the saturation point $B_m$ of the transformer B1 magnetic core, the induction in the $N_{P2}$ will decrease quickly, resulting in sharp increase of the collector current of transistor TR2, at a rate much higher than the increasing rate of base current, the transistor TR2 becomes unsaturated, the voltage drop Uce across the collector and emitter of transistor TR2 increases. Correspondingly, the voltage on transformer $N_{P2}$ winding reduces by the same value, and the voltage induced in coil $N_{B2}$ winding reduces, resulting in reduction of the base voltage of transistor TR2, so that transistor TR2 changes in the direction of cut-off. At this moment, the voltage in the coil of transformer B1 will reverse, to make the other transistor TR1 conduct, and after that, this process is repeated, to form push-pull oscillation. The waveform at the winding Ns output end is as shown in FIG. 2-1, it can be seen that except the "collector resonance Royer circuit" that outputs sinusoidal wave or approximate sinusoidal wave, the working waveform of the self-excitation push-pull converter is close to a square wave. The collector resonance Royer circuit is also called "cold cathode fluorescent lamp inverter", referred to as CCFL inverter or CCFL converter, the CCFL converter is connected in series an inductor with a inductance over ten times that of the main power winding in the power supply circuit, to obtain an output of sinusoidal wave or approximate sinusoidal wave. FIG. 3 is the square hysteresis line of the magnetic core of transformer B1, on which +Bm and −Bm are the two magnetic saturation points of the magnetic core. In a half cycle as shown in FIG. 2-1, the moving line of the working point of the magnetic core of transformer B1 is ABCDE, and its moving line in the next half cycle is EFGHA. In fact, when the current in coil windings corresponding to transistors TR2 or TR1, and the magnetic induction intensity produced by this current increase linearly with time to point D or H as shown in FIG. 3, the circuit will perform push-pull conversion, i.e. when one transistor conducts, the opposite transistor cuts off. As transistors have a storage time, that is, after the transistor base has received a cutting off signal, the collector current will start to drop with a short time delay till cut-off, the storage time can occur in FIG. 3, the moving line of the magnetic core working point will be from point D to E, correspondingly, the moving line of the magnetic core working point will move from point H to A.

Its feature is: push-pull oscillation is conducted by using the saturation characteristics of the magnetic core, the transformer output waveform is approximate square wave, and the circuit conversion efficiency is fairly high. As the magnetic core should become nearly saturated at the specific time moment, a magnetic core with air gap cannot be used. A self-excitation push-pull converter must use a magnetic saturated magnetic core, and magnetic core plus air gap is a generally known means to resist magnetic saturation.

In this literature, magnetic core, as in other generally known literatures, refers to a ferrite material, i.e. a sintered magnetic metal oxide of the mixture of various ferrite oxides, and magnetic cores are mostly used in high frequency applications. Iron cores are made of silicon sheet material and are suitable only for low frequency inductance lines and LV transformer, and are normally used in low frequency and voice frequency applications.

A structure similar to that shown in FIG. 1-2 is a circuit with the switch drive function separated from the main power transformer. As described above, the self-oscillating frequency and drive function of the circuit will be realized by the magnetic saturated transformer B1, therefore, the main power transformer B2 can work in a non-saturated state. Although magnetic saturation occurs at B1, the magnetic saturation consumes very small amount of energy because of the comparatively small volume of B1, and under the identical conditions, the overall efficiency of the Jensen circuit is slightly high.

Presently in the field of switching power, self-excitation push-pull converters are used extensively, because in a small signal model, the only AC small signal input impedance is a positive power, while the input impedance of AC small signals of other switching power is negative, so it is extremely inconvenient to use a shunt switching power with negative input impedance of AC small signals, but the input impedance of AC small signals of self-excitation push-pull converters is positive, very convenient in shunt and cascade applications. But the above-mentioned self-excitation push-pull converters have the following disadvantages:

1. the Converter Efficiency is Low with Light Loads

As the Royer circuit performs push-pull oscillation by using the saturation characteristics of the magnetic core, its static current cannot be too low, and Table 1 shows the measured parameters of the Royer circuit. If a circuit as shown in FIG. 1-1 is used to make a converter with input DC at 5V, output DC at 5V and output current of 200 mA, i.e. with an output power of 1 W. Downstream the transformer, the output is in the circuit structure as shown in FIG. 4, which is a generally known full-wave rectifying circuit, both D41 and D42 are RB160 Schottky diodes. The main parameters of the circuit are: the capacitor C is 1 uF, resistor R1 is 1 KΩ, capacitor C1 is 0.047 uF, and TR1 and TR2 are switching transistors with magnification factor of about 200, with its maximum collector working current being 1 A. The primary side coils $N_{P1}$ and $N_{P2}$ have respectively 20 turns, feedback coils $N_{B1}$ and $N_{B2}$ respectively 3 turns, secondary side coils $N_{S1}$ and $N_{S2}$ respectively 23 turns, and the magnetic core is a common ferrite loop magnetic core with an outer diameter of 5 mm and sectional area of 1.5 mm², with the common name magnetic loop, and its 3D profile view is as shown in FIG. 5.

In actual measurement, the circuit has a no-load working current of 18 mA, its working frequency is 97.3 KHz, close to 100 KHz, for the conversion efficiency test, the circuit as shown in FIG. 6 was used, VI voltmeter head is working voltage Vin, i.e. the input voltage. A1 ammeter head is input current Iin, i.e. the working current; V2 voltmeter head is output voltage Vout, and A2 ammeter head the output current Iout; so the conversion efficiency can be calculated using formula (2). The conversion efficiency of the circuit is:

$$\eta = \frac{Vout \times Iout}{Vin \times Iin} \times 100\% \qquad \text{Formula (2)}$$

where: Vin is working voltage, i.e. the input voltage, Iin is input current; Vout is output voltage, and Iout is output current. In the test, the wiring method as shown in FIG. 6 is used, with RL as the variable load, to effectively reduce the measuring error. Both ammeter and voltmeter are model MY65 4-1/2 digital universal meters of MASTECH® Brand set at steps 200 mA and 20V or 200V, and four and more universal meters were used at the same time.

When the model MY65 4-1/2 digital universal meter is used to measure voltage, the internal resistance is 10 MΩ, and is 200 mA at the 200 mA current step. When the current exceeds 200 mA, two ammeters are used and set at 200 mA to measure it in parallel, and the sum of the current readings of the two meters is the measured value. Measurement using ammeters connected in parallel is a mature existing technology in electronic engineering.

When the circuit as shown in FIG. 1-1 is used and the above-mentioned parameters are set, with the output current at 5% of the full load of 200 mA, or 10 mA, the measured parameters are as shown in Table 1 below.

TABLE 1

| Input current Iin | Input voltage Vin | Output current Iout | Output voltage Vout | Efficiency (Calculated value) |
|---|---|---|---|---|
| 28.4 mA | 5.060 V | 9.96 mA | 5.487 V | 38.03% |

It can be seen from the table above that, when the output is 5% of full load, the efficiency is only 38.03%, which is highly representative in the low power module power sources presently used in the industry. FIG. 2-2 is the measured ripple waveform diagram by overlapping the output DC voltage of the above-mentioned transformer. The test condition is a full load output of 200 mA at a peak value of 135.7.

With the Jensen circuit as shown in FIG. 1-2, although a small transformer B1 is used to realize magnetic saturation while the main power transformer B2 works in a non-saturated state, in an attempt to increase the efficiency, in fact, the use of two transformers results in an additional element to produce loss, and the design of the small transformer B1 should take into account the output power of the whole circuit, after careful commissioning, at 5V output, the no-load current of the Jensen circuit outputting 5V/200 mA is reduced to 16 mA, and when the output is only 5% of full load, the efficiency increases a little from that of the above-mentioned Royer circuit, to 40.91%.

2. It is not Possible to Further Increase the Efficiency at Rated Load

With the self-excitation push-pull converter, take the Royer circuit as an example, as each push-pull operation of the circuit is realized when approaching or at magnetic saturation of the magnetic core, and the energy consumed by magnetic saturation is lost in the form of heat, therefore, to increase the conversion efficiency of the circuit, the working frequency of the converter should be reduced, it can be seen from formula (1) that, with the input voltage remaining unchanged, it can be achieved only by increasing the value of the denominator in formula (1), i.e. increasing the magnetic induction intensity Bw, or increasing the number of coil turns N, or increasing the effective sectional area S of the magnetic core. In converter products today, magnetic cores with extremely high working magnetic induction intensity Bw have been selected, the number of coil turns N increased, resulting in increased copper loss; the increase of the effective sectional area S of magnetic core also increases the loss each time when it approaches or enters the magnetic core magnetic saturation, thus reducing instead of increasing the conversion efficiency of the converter. Therefore, in the design of a self-excitation push-pull converter, it is quite difficult to select between these parameters.

To increase the conversion efficiency of the Jensen circuit, for the similar reasons, if the effective sectional area S of the magnetic core of the small transformer B1 is too small, the pushing power will be insufficient, the switching transistor cannot become well saturated and conducting, resulting in increased voltage drop loss and reduced converter conversion efficiency. When the effective sectional area S of the magnetic core of the small transformer B1 is taken too high, the self-loss will also be high. Of course, the problem insufficient pushing power can be solved by increasing the number of turns N of the coil, but it also results in the following process problem: with increased number of turns N, as the small transformer B1 must work under magnetic saturation state and no air gap can be made, it will make the winding highly difficult.

3. when the Input Voltage is High, there are Many Turns on Transformer B1, Making the Processing Quite Difficult.

In a self-excitation push-pull converter, take the Royer circuit as an example, it can be seen from formula (1) that, when the input voltage increases, if the working frequency of the self-excitation push-pull converter remains unchanged, the corresponding parameter of the denominator in formula (1) should be increased, and for industrial class small module power sources of the same series and same power, magnetic cores of the identical size are often used. In this case, the problem can be solved only by increasing the number of coil turns N, for example, with the circuit parameters shown in FIG. 1-1, if a product with input of 24V is made, the number of turns in the primary side coils $N_{P1}$ and $N_{P2}$ should be increased from 20 each for 5V to 96 each, as the transformer B1 in FIG. 1-1 must work in a status allowing magnetic saturation, no air gap is permissible, it is quite difficult to wind the coil, at present, it is quite difficult to wind so many turns of enameled wire on a small magnetic ring with a diameter less than 10 mm, either with a machine or manually. When a machine is used, when the first layer is finished, it is quite difficult to wind the second layer on the first one, as it will break the wire sequence of the first layer, and the winding will be made worse and worse. In manual winding, it is quite difficult to avoid one or two turns more or less as the number of turns must be memorized entirely by workers, if the number of turns is different, deviation will occur in the output voltage, and in a serious case, the original function cannot be realized when the transformer is installed.

If the effective sectional area S of the magnetic core is doubled, the number of turns can be reduced to 48, but in this case, as the effective sectional area S of the magnetic core of transformer B1 is doubled, at the same frequency, the self loss will also double, so the converter conversion efficiency will be reduced.

Therefore, in the industrial field and market today, it is difficult to find self-excitation push-pull converter modules with working voltage of 48V and over, and also for this reason, the efficiency has to be reduced for less number of turns.

4. it is Difficult to Increase the Working Frequency

As the self-excitation push-pull converter circuit performs each push-pull operation by the magnetic core approaching or reaching magnetic saturation, therefore, when the working frequency increases, its loss will increase and conversion efficiency will reduce.

To the Jensen circuit, for the similar reason, the effective sectional area S of the magnetic core of the small transformer B1 become smaller, for a 24V input voltage, it often requires to have 60 turns on the primary side, as there is only one primary side coil, it can be wound with two wires in parallel for only 30 turns, and then they can be connected in parallel as 60 turns, but the small transformer B1 has a smaller diameter, it is quite difficult to wind it either with a machine or manually. For a 48V input voltage, it is almost impossible to make a small transformer B1. Similarly, if the effective sectional area S of the magnetic core is doubled, there can be less turns, but at the same working frequency, the self-loss will double and the conversion efficiency of the converter will reduce.

5. Current Spikes Appear when the Circuit Conducts or is Cut Off, Therefore the Converter Efficiency is Low In the original book *Design of Switching Power* published by the Electronic Industry Press, it is also mentioned in the last line on p. 168 that, current spikes appear when the circuit conducts or is cut off, therefore the converter efficiency is reduced to 50.6%. The ISBN No. of the book is 7-121-01755-5. In fact, as most self-excitation push-pull converter for industrial use at present use magnetic core solid surface transformer, for example the conversion efficiency of the 5V/5V product is normally about 78%, but even so, this efficiency is fairly low in the times that energy conservation is advocated.

At present, for self-excitation push-pull converters mentioned in the documents with the file No. 201010604284.7, 201110200894.5, 201110242377.4, 201110247645.1 and 201110272261.5, there is no suitable technology to overcome the afore-said disadvantages of the self-excitation push-pull converters, and these disadvantages are summarized as follows:

1) The converter efficiency is low with light loads;
2) It is not possible to further increase the efficiency at rated load;
3) When the input voltage is high, there are many turns on transformer B1, making the processing quite difficult;
4) It is difficult to increase the working frequency;
5) Current spikes appear when the circuit conducts or is cut off, and therefore the converter efficiency is low.

SUMMARY OF THE INVENTION

Therefore, the technical issue to be solved by this invention is to overcome the disadvantages of the existing self-excitation push-pull converters, so that the efficiency of the self-excitation push-pull converter can be substantially improved when the converter is used with light loads; its efficiency can be further improved when used at rated load, the number of turns of the coils on the magnetic saturated transformers in the self-excitation push-pull converter can be reduced; and the working frequency of the self-excitation push-pull converter can be increased while maintaining its loss at a relatively low level. It will also reduce the current spikes appearing when the self-excitation push-pull converter conducts or is cut off, to further increase the efficiency while lowering the output ripple.

To solve the above-mentioned technical issues, this invention provides a self-excitation push-pull converter, including the transformer, characterized in that: the magnetic core or iron core of the transformer has a partial section; the partial section can reach magnetic saturation before the main section with the same increasing magnetic field excitation. Preferably, the main section is wound with coil and the partial section has no coil. The main section is defined as the part other than the partial section that reaches magnetic saturation first.

First embodiment of this invention: the transformer includes at least one magnetic core, which includes a magnetic ring with a main section and a thin section, characterized in that the thin section has a length less than one eighth of the total magnetic path length, and a sectional area below 80% and above 4% of the sectional area of the main section. The thin section is made of the same material as the main section and also referred to as the partial section. Relative to the main section, the smaller the sectional area of the partial section is, the shorter its length should be in order to ensure the mechanical strength of the partial section. The main section should accounts for over one eighth of the total magnetic path length. The term "magnetic ring" collectively refers to a magnetic core without any air gap and with closed magnetic path. There can be two or more partial sections connected in serial, and functionally they can be an equivalent to one partial section with a longer length.

Preferably, the partial section has a length over 0.05 mm, so that it is technically feasible to produce.

Preferably, there is a transition section between the main section and partial section, and the main section accounts for over seven eighths of the total magnetic path length, to facilitate demoulding after magnetic powder moulding of the magnetic core.

Preferably, on the main section there are two or more salient points, to prevent wires on the main section from sliding onto the partial section, or to locate different windings in given areas to prevent them from intersecting with each other.

Second embodiment of this invention: the transformer includes at least one magnetic core, which has a magnetic ring with a main section and a thin section, characterized in that: the thin section is of a different material from the main section and has a length less than one eighth of the total magnetic path length. The partial section reaches magnetic saturation before the main section with the same increasing magnetic field excitation. The term "magnetic ring" collectively refers to a ring-shaped magnetic core without air gap and with closed magnetic path. There can be two or more partial sections connected in serial, and functionally they can be an equivalent to one partial section with a longer length.

Preferably, the partial section has a length over 0.02 mm, so that it is technically feasible to produce.

Preferably, the main section and the partial section are equal in the size of the sectional area.

Preferably, there is a transition section between the main section and partial section, and the main section accounts for over seven eighths of the total magnetic path length, to facilitate demoulding after magnetic powder moulding of the magnetic core.

Preferably, on the main section there are two or more salient points, to prevent wires on the main section from sliding onto the partial section, or to locate different windings in given areas to prevent them from intersecting with each other.

The working principle of this invention: in the self-excitation push-pull converter based on above-mentioned technical plan, take the Royer circuit in FIG. 1-1 as an example, the transformer B1 in the self-excitation push-pull converter in FIG. 1-1 is based on the technical plan of the this invention as described above, there is no change in the push-pull working principle of the circuit. When transistor TR2 becomes saturated and conducts, correspondingly, transistor TR1 completely cuts off, the current in transistor TR2 corresponding coil $N_{P2}$ winding and the magnetic induction intensity produced by this current increases linearly with time, but when the magnetic induction intensity increases to the saturation point $B_m$ of the transformer B1 magnetic core, the inductance in the coil will decrease quickly, resulting in sharp increase of the collector current of transistor TR2, at a rate much higher than the increasing rate of base current, the transistor TR2 becomes unsaturated, the voltage drop Uce across the collector and emitter of transistor TR2 increases. Correspondingly, the voltage on transformer $N_{P2}$ winding reduces by the same value, and the voltage induced in coil $N_{B2}$ winding reduces, resulting in reduction of the base voltage of transistor TR2, so that transistor TR2 changes in the direction of cut-off. At this moment, the voltage in the coil of transformer B1 will reverse, to make the other transistor TR1 conduct, and after that, this process is repeated, to realize push-pull oscillation.

The energy loss occurs mainly when the magnetic induction intensity has increased to the saturation point $B_m$ of the magnetic core of transformer B1, in the existing technology, a magnetic core of the same sectional area is used, basically the whole magnetic core will reach the saturation point $B_m$, and more energy will be required to reach saturation. As shown in FIG. 3, the moving line of the working point of the magnetic core of transformer B1 is ABCDE, and its moving line in the next half cycle is EFGHA, that is, in a full cycle, the working area of the magnetic core with the existing technology is the whole area, as shown in shadow 71 in FIG. 7.

But in the self-excitation push-pull converter of this invention, the transformer has a partial section that can reach magnetic saturation before the main section, i.e., the partial section can reach magnetic saturation before the main section when excited by the same increasing magnetic field, but it has a very short length, when this small partial section of magnetic core reaches its own saturation point Bm, it can also trigger the push-pull oscillation of the circuit, the working area of the partial section of the magnetic core is the whole area, the same as shadow 71 in FIG. 7, but the partial section is very short, so the energy consumed is substantially reduced. In the meantime, the current spike in the self-excitation push-pull converter of this invention when the transistors conduct and cut off also decreases, with the benefit that the ripple overlapping on the DC output current of the self-excitation push-pull converter of this invention has also reduced. As the main section does not work in a saturated status, the working area of its corresponding magnetic core is as shown in shadow 81 in FIG. 8, and has been significantly reduced, so the main section consumes very little energy, and the total energy consumption by the magnetic core of this invention can be greatly reduced. The solution of this invention can reduce the energy consumption in each push-pull conversion, at the same working frequency, the consumption of the self-excitation push-pull converter circuit can be reduced, and the working frequency can be increased without much increase of loss, so that the conversion efficiency will not reduce at high frequencies.

As described above, at the same working frequency, the no-load current of the self-excitation push-pull converter circuit of this invention will reduce correspondingly, i.e. the no-load loss can reduce in the same proportion, accordingly, in a self-excitation push-pull converter of this invention, the efficiency of the converter will increase substantially when the load is low. Similarly, the corresponding efficiency of the converter can increase substantially in the entire working range from low load to full load. On the basis of the above principle, as it is not necessary for the main section to work between the two saturation points, the sectional area of the main section can be increased, so that the inductance per turn will increase in proportion to the increase of sectional area. In this way, the total number of turns can be reduced in proportion to realize the same inductance, so that the number of turns of the coil of transformer B1 in the self-excitation push-pull converter of this invention can be reduced, to realize the purpose of this invention. The detailed working principle and formula derivation will be demonstrated in specific embodiments.

In existing technology, magnetic cores of equal sectional area all over are used to make transformers, increasing the sectional area of the main section will result in increased magnetic saturation loss, so the conversion efficiency of the self-excitation push-pull converter will remain unchanged and even reduce somewhat at full load, and in low load, because of high loss in the circuit itself, the conversion efficiency reduces seriously.

When there are two or more partial sections in the magnetic core of the transformer of this invention, and each has the same size of the sectional area, they are functionally equal to a single partial section of a longer length. The working principle remains the same as described above.

When there are two or more partial sections in the magnetic core of this invention and their sectional areas are not equal in size, the partial section with the smallest sectional area or the partial section that reaches magnetic saturation first will play the push-pull role, while other partial sections will not become magnetic saturated internally in the core, and therefore they will not participate in the push-pull work. As the sectional area of non-participating partial sections is smaller than that of the main section, they will reduce the inductance of the coil on the whole magnetic core, in the same working principle as described above.

Similarly, when the magnetic core adopted in the above-mentioned technical plan is used in transformer B1 in the Jensen circuit as shown in FIG. 1-2 or the magnetic saturation transformers in other Jensen circuits reported in the literatures, it can also increase the conversion efficiency of the Jensen circuit in the whole range from light load to full load. And it can also reduce the number of turns of the magnetic saturation transformer B1 and increase the working frequency of the circuit.

As compared with existing technologies, this invention has the following advantageous effect:

(1) It can substantially improve the efficiency of the self-excitation push-pull converter when the converter is working with low load.

(2) The conversion efficiency can be further increased at rated load and in the whole working range from no-load to full load, that is, the input power consumption is reduced.

(3) It can reduce the number of turns of the coil of transformer B1 in the self-excitation push-pull converter.

(4) It can increase the winding efficiency of the transformer for self-excitation push-pull converter, and shorten the production work time per piece.

(5) It can make possible self-excitation push-pull converter with an input voltage of 48V and greater, with a simple production process.

(6) It can reduce the working current of self-excitation push-pull converter during no-load.

(7) It can operate at a high working frequency of the self-excitation push-pull converter.

(8) It can realize high efficiency for a micro power DC/DC module up to 100 mW.

(9) Under the same power and load conditions, it can realize output voltage with low ripple effects.

BRIEF DESCRIPTION OF THE DRAWINGS

FIG. 1-2 is a common application circuit diagram of the Jensen circuit of self-excitation push-pull converter;

FIG. 2-1 is the output side waveform diagram of the Royer circuit winding Ns in FIG. 1-1;

FIG. 2-2 is the DC output voltage of the self-excitation push-pull converter superposed with the ripple waveform;

FIG. 9-1 is the front view of the magnetic core in embodiment 1 of this invention;

FIG. 9-2 is the side view of the magnetic core in embodiment 1 of this invention;

FIG. 9-3 is the top view of the magnetic core in embodiment 1 of this invention;

FIG. 9-4 is the 3D view of the magnetic core in embodiment 1 of this invention;

FIG. 10-1 is the schematic diagram of the magnetic path $l_w$ inside the main section of the magnetic core in embodiment 1 of this invention;

FIG. 10-2 is the schematic diagram of the magnetic path $l_t$ inside the partial section of the magnetic core in embodiment 1 of this invention;

FIG. 11-1 is the front view of the magnetic core for comparison with the existing technology;

FIG. 11-2 is the side view of the magnetic core for comparison with the existing technology;

FIG. 11-3 is the top view of the magnetic core for comparison with the existing technology;

FIG. 13-1 is the front view of the magnetic core in embodiment 2 of this invention;

FIG. 13-2 is the side view of the magnetic core in embodiment 2 of this invention;

FIG. 13-3 is the top view of the magnetic core in embodiment 2 of this invention;

FIG. 15-1 is the front view of the magnetic core in embodiment 3 of this invention;

FIG. 15-2 is the side view of the magnetic core in embodiment 3 of this invention;

FIG. 15-3 is the top view of the magnetic core in embodiment 3 of this invention;

FIG. 15-4 is the 3D view of the magnetic core in embodiment 3 of this invention;

FIG. 16-1 is the front view of the magnetic core in embodiment 4 of this invention;

FIG. 16-2 is the side view of the magnetic core in embodiment 4 of this invention;

FIG. 16-3 is the top view of the magnetic core in embodiment 4 of this invention;

FIG. 16-4 is the 3D view of the magnetic core in embodiment 4 of this invention;

FIG. 17-1 is the front view of the magnetic core in embodiment 5 of this invention;

FIG. 17-2 is the side view of the magnetic core in embodiment 5 of this invention;

FIG. 17-3 is the top view of the magnetic core in embodiment 5 of this invention;

FIG. 17-4 is the 3D view of the magnetic core in embodiment 5 of this invention;

FIG. 18-1 is the front view of the magnetic core in embodiment 6 of this invention;

FIG. 18-2 is the side view of the magnetic core in embodiment 6 of this invention;

FIG. 18-3 is the top view of the magnetic core in embodiment 6 of this invention;

FIG. 18-4 is the 3D view of the magnetic core in embodiment 6 of this invention;

FIG. 19-1 is the front view of the magnetic core in embodiment 7 of this invention;

FIG. 19-2 is the side view of the magnetic core in embodiment 7 of this invention;

FIG. 19-3 is the top view of the magnetic core in embodiment 7 of this invention;

FIG. 19-4 is the 3D view of the magnetic core in embodiment 7 of this invention;

FIG. 20-1 is the front view of the magnetic core in embodiment 8 of this invention;

FIG. 20-2 is the side view of the magnetic core in embodiment 8 of this invention;

FIG. 20-3 is the top view of the magnetic core in embodiment 8 of this invention;

FIG. 20-4 is the 3D view of the magnetic core in embodiment 8 of this invention.

EMBODIMENTS

Embodiment 1

Figure 1:
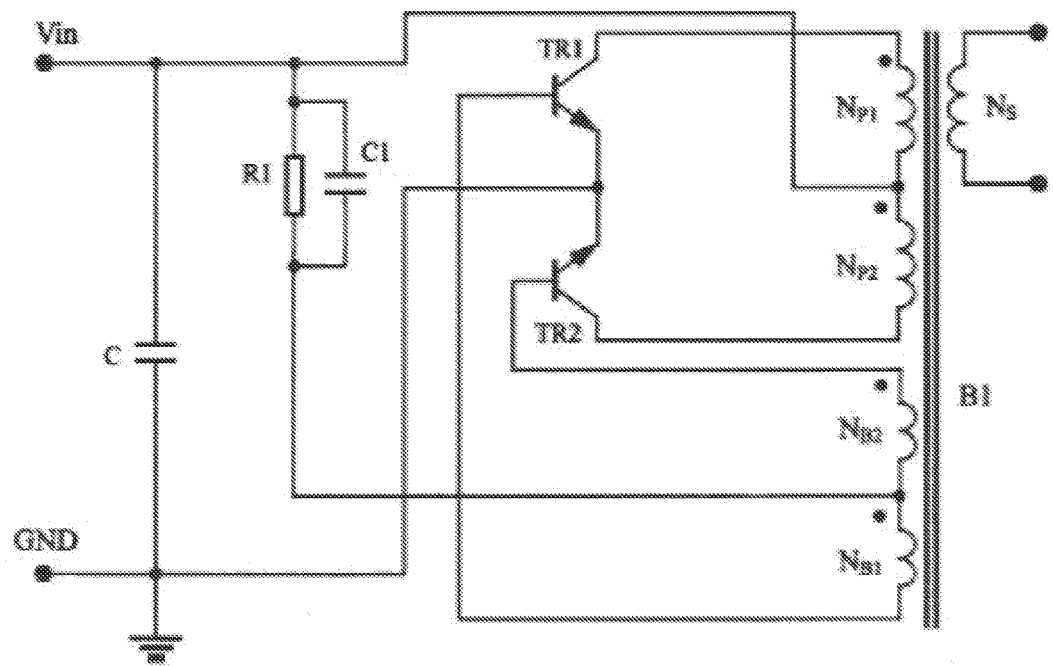
FIG. 1-1 is a common application circuit diagram of the Royer circuit of self-excitation push-pull converter.
Figure 4:
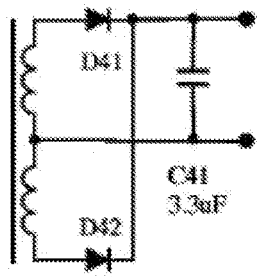
FIG. 4 shows a generally known full-wave rectifying circuit.
Figures 1, 9:
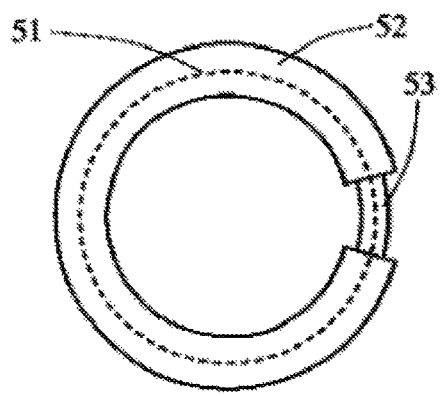
Figures 2, 9:
Figures 3, 9:
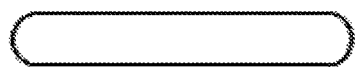
Figures 4, 9:
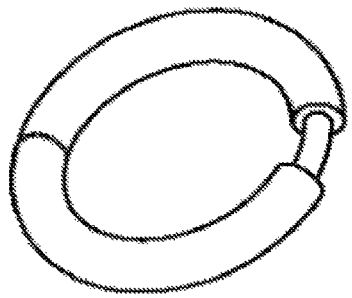

FIG. 9-1 to FIG. 9-4 show the magnetic core used in the transformer in the self-excitation push-pull converter of embodiment 1 of this invention, this magnetic core has a small partial section with a sectional area smaller than that of the magnetic core in the existing technology, and the length of this partial section is short. Accordingly, to clearly demonstrate the effect of this embodiment, the sectional area of the main section is set to be the same as that of the magnetic core of the existing technology.

Figure 5:
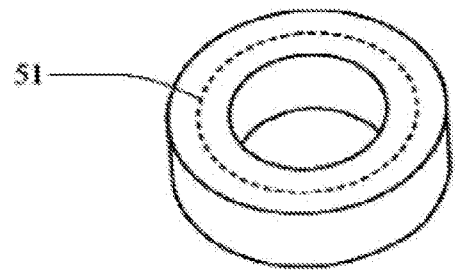
FIG. 5 is the ring type magnetic core used by the existing self-excitation push-pull converters.

The ratio of the main section sectional area to partial section sectional area is the reciprocal of the percentage points described in the technical plan, denoted as constant k, as the reciprocal of <80% and >4% in the above technical plan, i.e., between 1.25 times and 25 times. FIG. 5 shows the ring shaped magnetic core of the existing technology, with a constant sectional area as shown and, according to the existing generally known knowledge, the inductance of the coil wound over it is:

$$L = \frac{4\pi \times \mu i \times Ae \times N^2}{l_e} \quad \text{Formula (3)}$$

where: $\mu i$ is magnetic core relative permeability, Ae is the same as S in formula (1), being the effective sectional area (cm$^2$) of the magnetic core, N is the number of turns of the coil, $l_e$ is the magnetic path length (cm), and the perimeter of the circumference dotted line 51 in FIG. 5 is magnetic path length $l_e$.

Figures 1, 2:
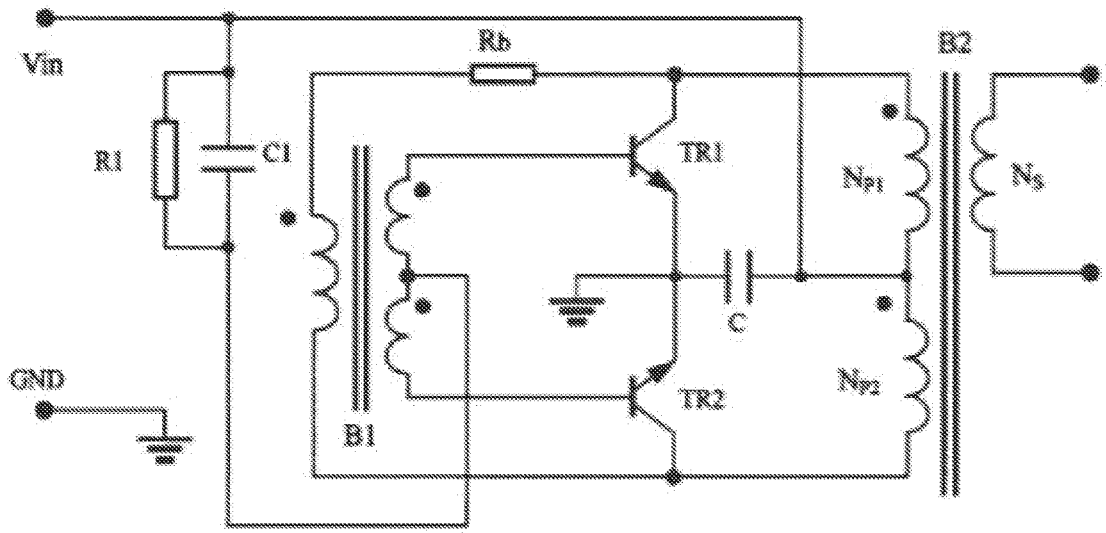
Figures 1, 2:
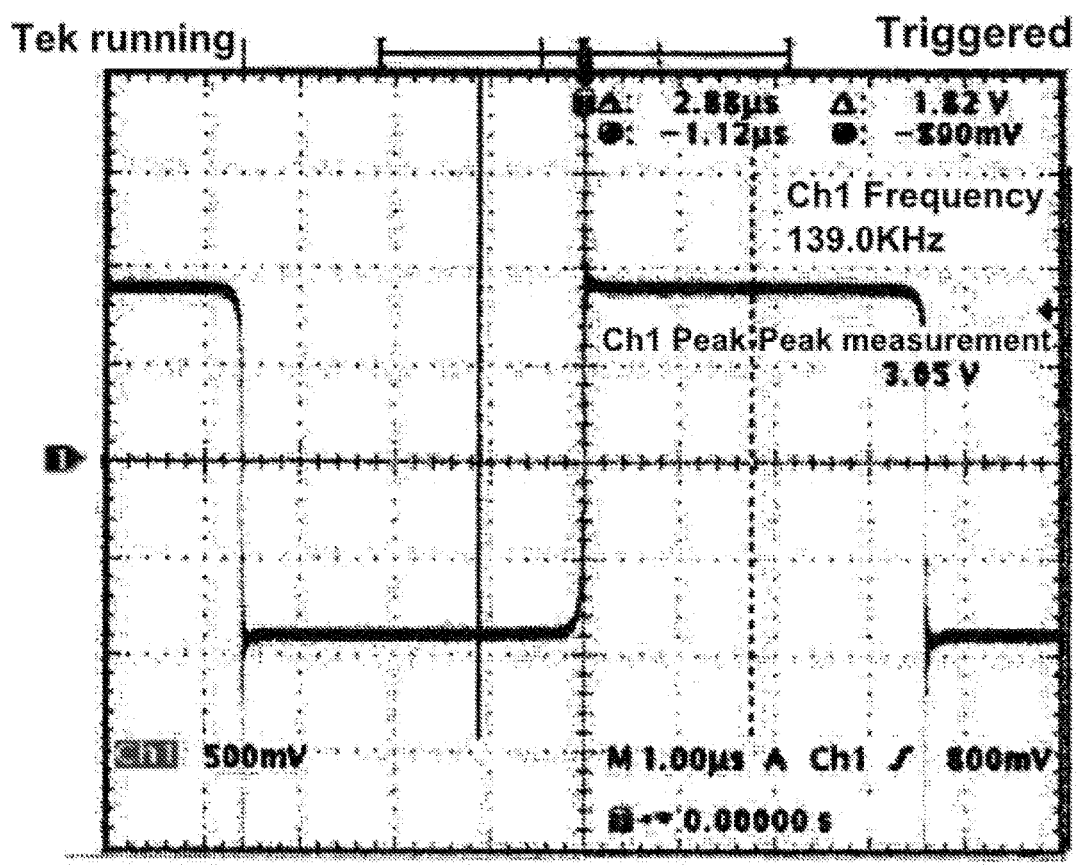
Figure 2:
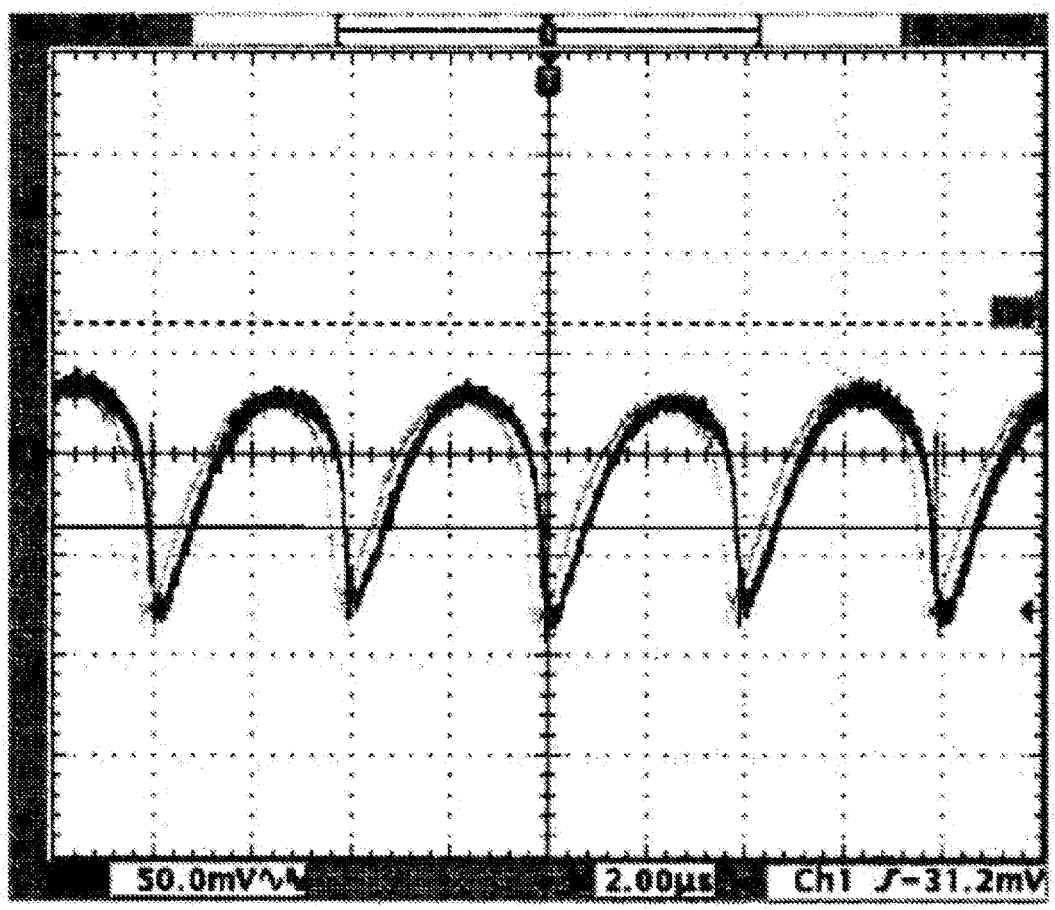
Figure 3:
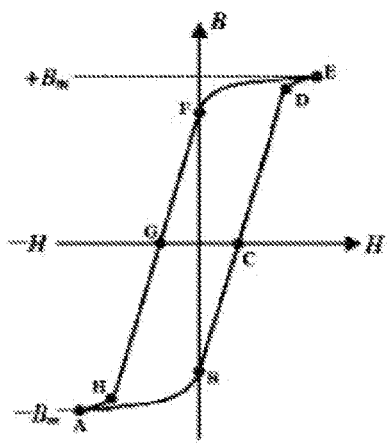
FIG. 3 is the square hysteresis loop of the magnetic core of transformer B1 in the Royer circuit of FIG. 1-1.
Figures 1, 10:
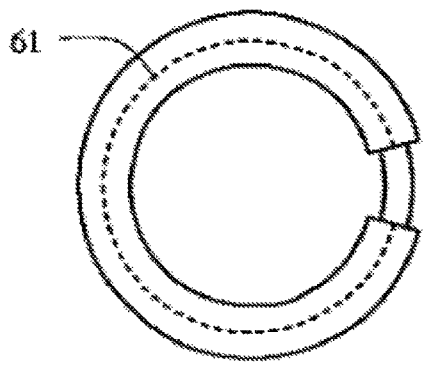
Figures 2, 10:
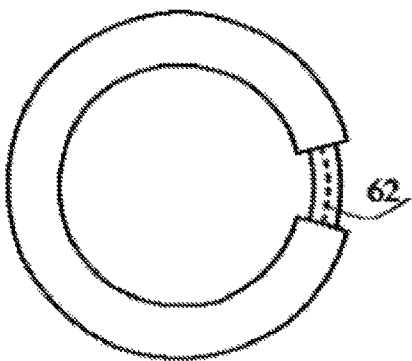

FIG. 9-1 to FIG. 9-4 show the structural diagram of the magnetic core used in the transformer in the self-excitation push-pull converter in embodiment 1 of this invention, FIG. 9-1 is the front view of the magnetic core in embodiment 1 of this invention; FIG. 9-2 is the side view of the magnetic core in embodiment 1 of this invention; FIG. 9-3 is the top view of the magnetic core in embodiment 1 of this invention; and FIG. 9-4 is the 3D view of the magnetic core in embodiment 1 of this invention. In FIG. 9-1, the circumference dotted line 51 is the length of the physical magnetic path, which is actually divided into two sections, one is in the main section, its length is denoted as $l_w$, being the magnetic path inside the main section 52 in FIG. 9-1. The other section of the physical magnetic path is within the partial section, its length is denoted as $l_t$, being the magnetic path inside the partial section 53 in FIG. 9-1. FIG. 10-1 and FIG. 10-2 are respectively the schematic diagrams of the magnetic paths $l_w$ and $l_t$ in this invention, in FIG. 10-1, the dotted line 61 shows the magnetic path length $l_w$ within the main section, in FIG. 10-2, the dotted line 62 shows the magnetic path length $l_t$ within the partial section, then in embodiment 1 of this invention, the inductance of the coil wound on the thick part can be calculated using the Faraday's law, suppose the effective sectional area of the partial section is $S_1$, then the effective sectional area of the main section is $kS_1$, substitute them into formula (3), the inductance $L_1$ of the N-turn coil on the main section is:

$$L_1 = \frac{4\pi \times \mu i \times kS_1 \times N^2}{l_w + kl_t} \quad \text{Formula (4)}$$

where: μi is the relative permeability of the magnetic core; $S_1$ is the effective sectional area (cm²) of the partial section of the magnetic core, i.e. $kS_1$ is effective sectional area of the main section, the same as S in formula (1); N is the number of turns of coil; the denominator is the total equivalent length of the magnetic path (cm), being the sum of the equivalent length of the magnetic path $l_w$ in the main section and magnetic path $l_t$ in the partial section, as the effective sectional area of the partial section is 1/k that of the main section, to make equivalent the magnetic path $l_t$ within the partial section to the effective sectional area of the main section, according to the generally known theory, it should be multiplied by k, so the length is equivalent to $kl_t$, i.e.:

$$L_{equivalent\ length} = kl_t \quad \text{Formula (5)}$$

Figures 1, 11:
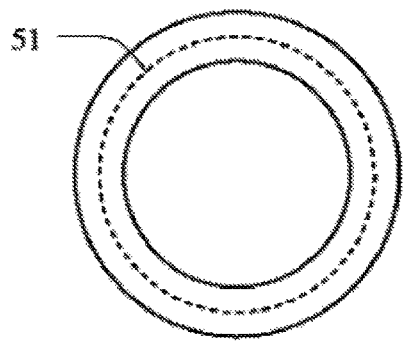
Figures 2, 11:
Figures 3, 11:
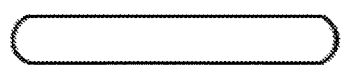

FIGS. 11-1, 11-2 and 11-3 are respectively the front view, side view and top view of the magnetic core for comparison with the existing technology, to facilitate the description of the principle of this invention, the main section sizes of the magnetic core for comparison with existing technology are basically identical to those in FIG. 9-1 to FIG. 9-4, that is, the length of the physical magnetic path 51 of the magnetic core in FIG. 11-1 is equal to the length of the physical magnetic path of the circumference dotted line 51 of the magnetic core used in this invention in FIG. 9-1, that is, the two magnetic cores have the identical outer diameter, as the effective sectional area of the magnetic core for comparison with the existing technology in FIG. 11-1 is equal all over, the length of its physical magnetic path 51 is equal to the actual magnetic path length, and the effective sectional area of the magnetic core in FIG. 11-1 is equal to the effective sectional area of the main section of the magnetic core of this invention in FIG. 9-1, i.e. $kS_1$, then we have:

$$l_e = l_w + l_t \quad \text{Formula (6)}$$

$$Ae = kS_1 \quad \text{Formula (7)}$$

By substituting the above into formula (3), the inductance $L_2$ of the coil with the same N turns as the magnetic core for comparison with the existing technology in FIG. 11-1 is:

$$L_2 = \frac{4\pi \times \mu i \times kS_1 \times N^2}{l_w + l_t} \quad \text{Formula (8)}$$

Compare formula (4) with formula (8), we obtain:

$$\frac{L_1}{L_2} = \left(\frac{4\pi \times \mu i \times kS_1 \times N^2}{l_w + kl_t}\right) \div \left(\frac{4\pi \times \mu i \times kS_1 \times N^2}{l_w + l_t}\right) = \frac{l_w + l_t}{l_w + kl_t} \quad \text{Formula (9)}$$

That is, the inductance of the transformer realized with the magnetic core of this invention and the same number of turns is:

$$L_1 = \frac{l_w + l_t}{l_w + kl_t} L_2 \quad \text{Formula (10)}$$

According to formula (10), as the sectional area of the main section is larger than that of the partial section, i.e. k is constantly greater than 1, the N-turn inductance $L_1$ of the magnetic core in embodiment 1 of this invention is less than the N-turn inductance $L_2$ of the magnetic core in the existing technology, as long as k is not taken too big, and the $l_t$ in the partial section is sufficiently short, the inductance $L_1$ of the N-turn coil of the magnetic core in embodiment 1 of this invention can be quite close to $L_2$, for example $L_1=0.99L_2$. With this, due to the existence of the partial section, when the magnetic core of this invention is used in a self-excitation push-pull converter, it can still trigger the push-pull oscillation in the circuit, because of the similar inductance, and the working frequency changes very little, as the magnetic saturation only occurs in the partial section, the energy loss is low, the no-load input current is small, therefore the conversion efficiency of the self-excitation push-pull converter can be substantially improved.

As the magnetic path $l_t$ of the partial section is the smaller the better, so that less part is required for the magnetic ring to reach magnetic saturation, and the loss can be reduced more apparently, the lower limit of the length of the partial section is taken as 0.05 mm because 0.05 mm is the limit of the current mould forming process or cutting process for magnetic cores, in fact, the purpose of this invention can be better realized with a size below 0.05 mm.

The following is the process to prove the dimensional limits in the claims, up to formula (10-10), the methods and processes in this proof are academically initials not published before:

With reference to formula (6), let x be the proportion of partial section length 53 in the total magnetic path length 51, we have:

$$l_t = x\, l_h \quad \text{Formula (10-1)}$$

$$l_w = (l-x)l_e \quad \text{Formula (10-2)}$$

According to formula (10), the N-turn inductance $L_1$ of the magnetic core in embodiment 1 of this invention is smaller than the N-turn inductance $L_2$ of the existing technology, a constant k is introduced, being a percentage, as it is convenient to express it in decimals, it is required that y be less than 0.1, and it can approach zero infinitely, suppose:

$$L_1 = (1-y)L_2 \quad \text{Formula (10-3)}$$

Substitute formula (6), formula (10-1), formula (10-2) and formula (10-3) into formula (10), we have:

$$(1-y)L_2 = \frac{l_e}{(1-x)l_e + kxl_c} L_2 \quad \text{Formula (10-4)}$$

Simplify formula (10-4) by dividing out $L_2$ on both left and right, and dividing out $L_e$ from the numerator and denominator on the right of the equation, we obtain:

$$1 - y = \frac{1}{1-x+kx} = \frac{1}{1+x(k-1)} \quad \text{Formula (10-5)}$$

Formula (10-5) is simplified as:

$$x(k-1) = \frac{1}{1-y} - 1 \quad \text{Formula (10-6)}$$

Because y is smaller and equal to 0.1, we have the following equations in engineering calculation:

$$1 - y^2 \approx 1 \quad \text{Formula (10-7)}$$

When y=0.1, formula (10-7) obtains 0.99≈1, with an error of 1%, it has satisfied with the precision for engineering calculation, as y is smaller than and equal to 0.1, formula (10-7) can obtain:

$$(1-y)(1+y) \approx 1 \quad \text{Formula (10-8)}$$

That is:

$$\frac{1}{1-y} \approx 1 + y \quad \text{Formula (10-9)}$$

In formula (10-9), y is taken as the maximum value 0.1, then we have:

$$1.\overline{1} \approx 1.1$$

That is, the circulating decimal 1.1 is approximately equal to 1.1, with an error of 1%, when y drops to 0.05, or by 5%, it is 1.05263≈1.05, with an error of 0.25%, which is already quite accurate. Substitute formula (10-9) into formula (10-6), we have:

$$x(k-1) = \frac{1}{1-y} - 1 \approx 1 + y - 1 = y$$

That is:

$$y \approx x(k-1) \quad \text{Formula (10-10)}$$

It can be seen from formula (10-3) that, in this invention, a smaller y value is preferable, as this will have a magnetic core inductance closer to the desired value, in this way, it is not necessary to increase the number of turns of the coil in embodiment 1 of this invention, and it is found in the experimental test that only when the sectional area of the partial section is below 80% of that of the main section, can it be ensured that no magnetic saturation will occur in the main section when magnetic saturation occurs in the partial section. As transistors have a storage time, that is, after the transistor base has received a cutting off signal, the collector current will drop with a time delay till cut-off, the storage time can occur in FIG. 3, the moving line of the magnetic core working point will be from point D to E, correspondingly, the moving line of the magnetic core working point will move from point H to A. When the moving line of the magnetic core working point moves from point D to E, it will increase the magnetic flux in the magnetic core, which will result in saturation within the main section with an area not quite different, therefore, only when the sectional area of the partial section is below 80% of that of the main section, can it be ensured that no magnetic saturation will occur in the main section when the moving line of the afore-said magnetic core working point moves from point D to E. k is the reciprocal of the afore-said 80%, being 1.25.

When k is taken as 1.25, if y in formula (10-10) is not greater than 3%, then:

$$x=y/(k-1)=0.03/(1.25-1)=0.12$$

x is the proportion of the partial section length 53 in the total magnetic path length 51, and 0.12 is approximately one eighth, i.e. the partial section has a length of over 0.05 mm, less than one eighth of the total magnetic path length.

Of course, it is only an example here with y as 3%, Table 2 below gives the tolerable deviation values commonly used in electronic engineering, all obtained using formula (10-10):

TABLE 2

| Expected value Y | X obtained from calculation | Percentage of partial section length in total magnetic path length |
| --- | --- | --- |
| 1% | 0.04 | One 25th |
| 2% | 0.08 | One 12th |
| 3% | 0.12 | One 8th |
| 5% | 0.2 | One 5th |
| 10% | 0.4 | About one 3rd |

It is verified in experimental test that a fairly good implementation effect can be obtained only when y is taken below 3% in this invention.

In actual application, when the value k exceeds 25, i.e. the sectional area of main section is 25 times that of partial section, the partial section is likely to break as its strength cannot be guaranteed, and an air gap will form after break, making it impossible to use in a self-excitation push-pull converter. When the value k exceeds 25, as the "window area" that can be wound with wire in the ring center is too small, it often requires extending the length of the geometric magnetic path 51 in FIG. 9-1 to implement it, it can be seen from formula (3) that, the extension of the length of the geometric magnetic path 51 can reduce the inductance, which in turn requires increasing the number of turns, therefore reducing the implementation effect.

Therefore, the value of k is required to be 1.25 to 25 times, and then the sectional area of the partial section is below 80% and above 4% of that of the main section.

In the following, a set of measured data will demonstrate the actual effect of the circuit in embodiment 1. Take FIG. 1-1 as an example, the plans adopted in the existing technology and presented in background technology are identical.

A circuit as shown in FIG. 1-1 is used to make a converter with input DC at 5V, output DC at 5V and output current of 200 mA, i.e. with an output power of 1 W. The downstream output of the transformer is in the circuit structure as shown in FIG. 4, which is a generally known full-wave rectifying circuit. The main parameters of the circuit are: the capacitor C is 1 uF, resistor R1 is 1 KΩ, capacitor C1 is 0.047 uF, and TR1 and TR2 are switching transistors with magnification factor of about 200, with its maximum collector working current being 1 A. The primary side coils $N_{P1}$ and $N_{P2}$ have respectively 20 turns, feedback coils $N_{B1}$ and $N_{B2}$ respectively 3 turns, secondary side coils $N_{S1}$ and $N_{S2}$ respectively 23 turns, and the magnetic core is a common ferrite loop magnetic core with an outer diameter of 5 mm and sectional area of 1.5 $mm^2$.

When it is made with the above parameters, at an output of 10 mA as 5% of the full load of 200 mA of the output current, the measured parameters are as shown in Table 1 of background technology, with an efficiency of 38.03%, and ripple of 135.7 mV (peak-peak value).

In the circuit of self-excitation push-pull converter in embodiment 1 of this invention, the magnetic core has an outer diameter of 5 mm, with the sectional area of main section being 1.5 $mm^2$ and that of partial section being 0.75 $mm^2$, i.e. the k value is 2, and the partial section has a length of 1 mm. No coil will be made on the partial section, a transformer as shown in FIG. 1-1 is made with the same number of turns, when the transformer made as per embodiment 1 of this invention is connected into the circuit, with the output current at 10 mA, or 5% of the full load 200 mA, the efficiency is tested also using the circuit in FIG. 6, and in conjunction with Table 1, the measured data are as shown in Table 3:

TABLE 3

|  | Input current Iin | Input voltage Vin | Output current Iout | Output voltage Vout | Output ripple (p-p value) | Efficiency (Calculated value) |
|---|---|---|---|---|---|---|
| Actually measured with existing technology | 28.4 mA | 5.060 V | 9.96 mA | 5.487 V | 135.7 mV | 38.03% |
| Actually measured with the transformer made as per embodiment 1 of this invention in the circuit | 23.5 mA | 5.066 V | 9.95 mA | 5.480 V | 69.6 mV | 45.80% |

Note:
the output ripple is tested with a full load of 200 mA.

Obviously, after using the self-excitation push-pull converter of this invention, the efficiency of the self-excitation push-pull converter when working with low load has been substantially increased, by (45.80%−38.03%)=7.77%. Obviously, after using the self-excitation push-pull converter of this invention, the output ripple of the self-excitation push-pull converter when working with full load has been substantially reduced, by 66.1 mV, or 48.7%. Further, conversion efficiency was measured over the full range from low load to full load at steps of 5%, and at steps of 10% when the load rate is over 40%, records were made in Table 4:

TABLE 4

| Load rate | Product | Iin (mA) | Vin (V) | Iout (mA) | Vout (V) | Efficiency | Increase of efficiency |
|---|---|---|---|---|---|---|---|
| 5% | Existing technology | 28.4 | 5.060 | 9.96 | 5.487 | 38.03% | 7.77% |
|  | This invention | 23.5 | 5.066 | 9.95 | 5.480 | 45.80% |  |
| 10% | Existing technology | 40.0 | 5.045 | 20.00 | 5.424 | 53.76% | 7.65% |
|  | This invention | 35.0 | 5.052 | 20.00 | 5.429 | 61.41% |  |
| 15% | Existing technology | 51.1 | 5.031 | 30.10 | 5.381 | 63.00% | 6.21% |
|  | This invention | 46.5 | 5.037 | 30.10 | 5.386 | 69.22% |  |
| 20% | Existing technology | 62.7 | 5.016 | 40.00 | 5.341 | 67.93% | 6.09% |
|  | This invention | 57.7 | 5.022 | 40.10 | 5.349 | 74.02% |  |
| 25% | Existing technology | 73.7 | 5.002 | 50.00 | 5.305 | 71.95% | 4.86% |
|  | This invention | 69.2 | 5.008 | 50.10 | 5.313 | 76.81% |  |
| 30% | Existing technology | 85.1 | 4.987 | 59.90 | 5.269 | 74.37% | 4.73% |
|  | This invention | 80.2 | 4.994 | 60.00 | 5.280 | 79.10% |  |
| 35% | Existing technology | 96.3 | 4.973 | 69.90 | 5.236 | 76.42% | 4.09% |
|  | This invention | 91.6 | 4.978 | 70.00 | 5.245 | 80.52% |  |
| 40% | Existing technology | 107.6 | 4.960 | 79.70 | 5.202 | 77.68% | 4.02% |
|  | This invention | 102.7 | 4.965 | 79.90 | 5.214 | 81.70% |  |
| 50% | Existing technology | 130.1 | 4.931 | 99.70 | 5.138 | 79.85% | 3.24% |
|  | This invention | 125.4 | 4.936 | 99.90 | 5.148 | 83.09% |  |
| 60% | Existing technology | 153.8 | 4.900 | 120.50 | 5.073 | 81.11% | 2.98% |
|  | This invention | 148.7 | 4.907 | 120.70 | 5.084 | 84.10% |  |
| 70% | Existing technology | 174.9 | 4.873 | 139.40 | 5.013 | 81.99% | 2.48% |
|  | This invention | 170.1 | 4.879 | 139.60 | 5.022 | 84.47% |  |
| 80% | Existing technology | 199.8 | 4.847 | 161.80 | 4.950 | 82.70% | 2.16% |
|  | This invention | 195.0 | 4.845 | 161.90 | 4.952 | 84.86% |  |
| 90% | Existing technology | 220.0 | 5.030 | 180.00 | 5.131 | 83.46% | 2.10% |
|  | This invention | 215.0 | 5.032 | 180.20 | 5.137 | 85.56% |  |
| 100% | Existing technology | 242.0 | 5.024 | 198.00 | 5.094 | 82.96% | 2.28% |
|  | This invention | 237.0 | 5.025 | 199.00 | 5.101 | 85.24% |  |

Figure 12:
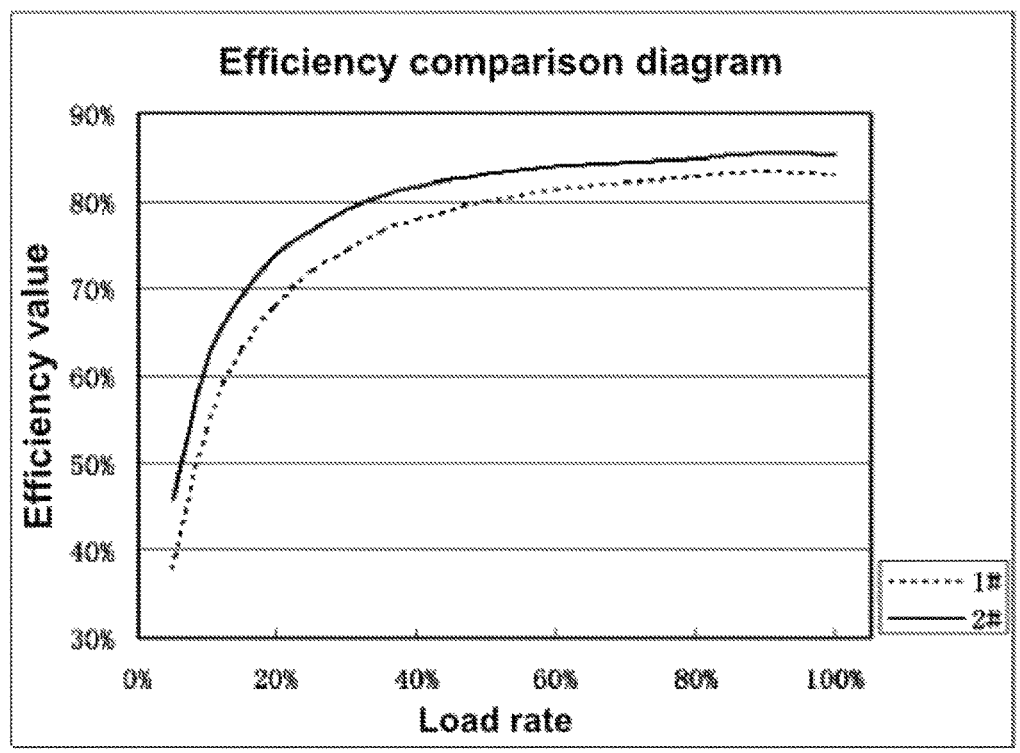
FIG. 12 is the efficiency comparison diagram of embodiment 1 of this invention with that of the existing technology already fitted.

Obviously, the conversion efficiency when the self-excitation push-pull converter of this invention is used has been obviously increased in the whole range from low load and full load, a comparison chart is made using software, refer to FIG. 12, in which curve 2# is the conversion efficiency curve of the self-excitation push-pull converter after using this invention, and curve 1# is the conversion efficiency curve of the self-excitation push-pull converter with the existing technology.

The no-load current of the self-excitation push-pull converter of this invention has been reduced from 18.0 mA of the existing technology to 12.0 mA, i.e. the no-load loss of the self-excitation push-pull converter of this invention has reduced from 90 mW of the existing technology to 60 mW.

Embodiment 2

In embodiment 2 of this invention, the transformer used in the self-excitation push-pull converter is slightly different from that in embodiment 1, in embodiment 1, the main section has the same sectional area as that of the magnetic core of existing technology, while the sectional area of the partial section is smaller than that of the existing technology, with a ratio of 1/k. To fully demonstrate the effect of this embodiment, in the transformer magnetic core used in embodiment 2 of this invention, the sectional area of the partial section is equal to that of the existing technology, that is, the sectional area of the main section is k times that of the existing technology.

FIGS. 11-1, 11-2 and 11-3 are respectively the front view, side view and top view of the magnetic core for comparison of the existing technology with that in embodiment 2 of this invention, suppose the sectional area of the magnetic core of the existing technology is $S_2$, when we substitute it into formula (3), the inductance $L_3$ of the coil with the same N turns as the magnetic core for comparison with the existing technology in FIG. 11-1 is:

$$L_3 = \frac{4\pi \times \mu i \times S_2 \times N^2}{l_e} \qquad \text{Formula (11)}$$

Figures 1, 13:
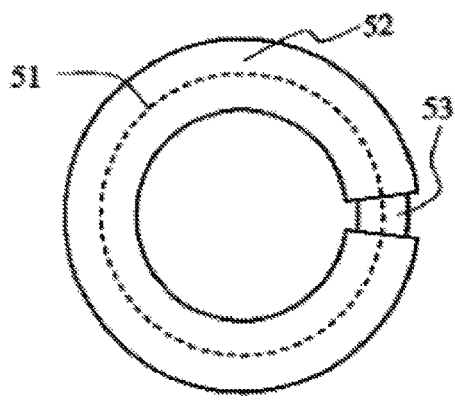
Figures 2, 13:
Figures 3, 13:
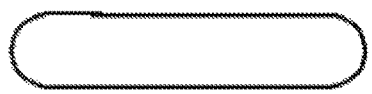

The transformer magnetic core used in embodiment 2 of this invention is as shown in FIG. 13-1 to FIG. 13-3, FIG. 13-1 is the front view of the transformer magnetic core used in embodiment 2 of this invention; FIG. 13-2 is the side view of the transformer magnetic core used in embodiment 2 of this invention; and FIG. 13-3 is the top view of the transformer magnetic core used in embodiment 2 of this invention. In the transformer magnetic core used in embodiment 2, there is a small partial section 53 with the same sectional area as the magnetic core for comparison with the existing technology, i.e. the sectional area of the partial section 53 of the magnetic core in FIG. 13-1 is equal to the above-mentioned $S_2$, but its length is very short. Correspondingly, the sectional area of the main section 52 in FIG. 13-1 is larger than the sectional area of the magnetic core of the existing technology, equal to $kS_2$, the ratio is the reciprocal of the percentage in the technical plan, denoted as constant k, for which reciprocal is taken as for the technical plan above, being 12.5 to 25 times. Accordingly, the inductance per turn of the coil on the main section increases, and the inductance $L_4$ with the same number of turns of coil on the magnetic core of embodiment 2 of this invention is:

$$L_4 = \frac{4\pi \times \mu i \times kS_2 \times N^2}{l_w + kl_t} \qquad \text{Formula (12)}$$

where: $\mu i$ is the relative permeability of the magnetic core; $S_2$ is the effective sectional area (cm²) of the partial section of the magnetic core, i.e. $kS_2$ is effective sectional area of the main section, the same as S in formula (1); N is the number of turns of coil; the denominator is the total equivalent length of the magnetic path (cm), being the sum of the equivalent length of the magnetic path $l_w$ in the main section and magnetic path $l_t$ in the partial section, as the effective sectional area of the partial section is 1/k that of the main section, to make equivalent the magnetic path $l_t$ within the partial section to the effective sectional area of the main section, it should be multiplied by k, so the length is equivalent to $kl_t$;

Compare formula (12) with formula (11), we obtain:

$$\frac{L_4}{L_3} = \left(\frac{4\pi \times \mu i \times kS_2 \times N^2}{l_w + kl_t}\right) \div \left(\frac{4\pi \times \mu i \times S_2 \times N^2}{l_w + l_t}\right) = \frac{kl_e}{l_w + kl_t} \qquad \text{Formula (13)}$$

That is, the inductance of the transformer realized with the transformer magnetic core used in embodiment 2 of this invention and the same number of turns is:

$$L_4 = k\left(\frac{l_e}{l_w + kl_t} L_3\right) \qquad \text{Formula (14)}$$

According to formula (14), if the magnetic path length lt in the partial section is sufficiently short, for instance close to 0.05 mm, the sum of the product $kl_t$ and magnetic path $l_w$ in the main section will approach the magnetic path length $l_e$ of the magnetic core for comparison with the existing technology in FIG. 11-1, i.e. the inductance of the N-turn coil of the magnetic core of this invention $L_4 \approx kL_3$.

With the same number of turns, the inductance can be increased by about k times, that means the number of turns can be reduced as appropriate to realize the same inductance as that with the background technology; in other words, the number of turns in this invention can be reduced as appropriate, and the ratio n of the number of turns with the existing technology to that of this invention is:

$$n = \sqrt{\frac{1}{k}} \qquad \text{Formula (15)}$$

i.e., when K is taken as 25, n=1/5=0.2, for the product with input voltage of 24V as mentioned in the background technology, a good working efficiency can be obtained with 96 turns, but in the circuit of this invention, it only requires 96×0.2=19.2 turns, or rounded as 20 turns, to realize the same effect. That is why in the technical requirement, the sectional area of the partial section length is below 80% and above 4% of the sectional area of the main section. In the above corresponding to embodiment 1, it is mentioned that: when the value k exceeds 25, as the "window area" in the magnetic ring center is too small, it often requires extending the length of the physical magnetic path 51 in FIG. 9-1 to implement it, it can be seen from formula (3) that, the extension of the physical magnetic path 51 can reduce the inductance, which in turn requires increasing the number of turns, therefore reducing the implementation effect.

Similarly, when k is taken as 16, n=1/4=0.25, the number of turns can be reduced to ¼ of the original, making it easy to wind it. For the product with input voltage of 24V as mentioned in the background technology, a good working efficiency can be obtained with 96 turns, but in the circuit of this invention, it only requires 96×0.25=24 turns, thus increasing the working efficiency in winding transformers.

In FIG. 13-1, due to the existence of the partial section 53, with the self-excitation push-pull converter of this invention, it can still trigger the push-pull oscillation in the circuit, as the magnetic saturation only occurs in the partial section 53, which is fairly short, the energy loss is low, i.e. the no-load input current of the circuit of self-excitation push-pull converter is small, therefore the conversion efficiency of the self-excitation push-pull converter can be substantially improved. As the energy loss is low, the working frequency of the self-excitation push-pull converter can be further increased, and the resulted benefit is: the number of turns wound on the magnetic core of embodiment 2 of this invention can be further reduced. In the following, a set of measured data will demonstrate the actual effect of the magnetic core in embodiment 2.

In the plan for comparison with existing technology, the plan adopted is the same as that in the background technology and presented in embodiment 1, and it is quoted below for convenience in comparison:

A circuit as shown in FIG. 1-1 is used to make a converter with input DC at 5V, output DC at 5V and output current of 200 mA, i.e. with an output power of 1 W. The downstream output of the transformer is in the circuit structure as shown in FIG. 4, which is a generally known full-wave rectifying circuit. The main parameters of the circuit are: the capacitor C is 1 uF, resistor R1 is 1 KΩ, capacitor C1 is 0.047 uF, and TR1 and TR2 are switching transistors with magnification factor of about 200, with its maximum collector working current being 1 A. The primary side coils $N_{P1}$ and $N_{P2}$ have respectively 20 turns, feedback coils $N_{B1}$ and $N_{B2}$ respectively 3 turns, secondary side coils $N_{S1}$ and $N_{S2}$ respectively 23 turns, and the magnetic core is a common ferrite loop magnetic core with an outer diameter of 5 mm and sectional area of 1.5 mm².

With the above parameters set, at an output of 10 mA as 5% of the full load of 200 mA of the output current, the measured parameters are as shown in Table 1 of background technology, with an efficiency of 38.03%. For other parameters, refer to the part of corresponding existing technology in Tables 3 and 4.

In the self-excitation push-pull converter in embodiment 2 of this invention, the magnetic core has an outer diameter of 5 mm, with the sectional area of main section being 3 mm² and that of partial section being 1.5 mm², i.e. the k value is 2, and the partial section has a length of 0.5 mm. No coil will be made on the partial section, the primary side coils $N_{P1}$ and $N_{P2}$ have respectively 7 turns, the feedback coils $N_{B1}$ and $N_{B2}$ respectively 2 turns, and the secondary side coils $N_{S1}$ and $N_{S2}$ respectively 8 turns, when the transformer made as per embodiment 2 of this invention is connected into the circuit, the measured working frequency of the circuit is 139 kHz, with a no-load input current of 6.9 mA.

Figure 6:
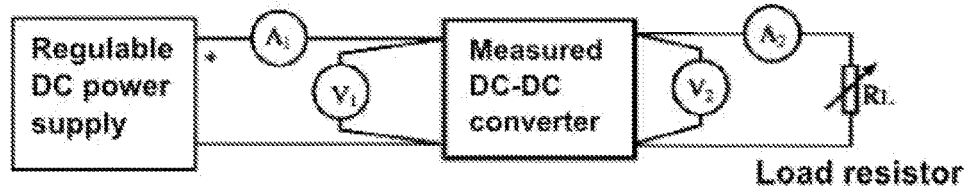
FIG. 6 is the principle diagram for conversion efficiency testing in general use in this article.
Figure 7:
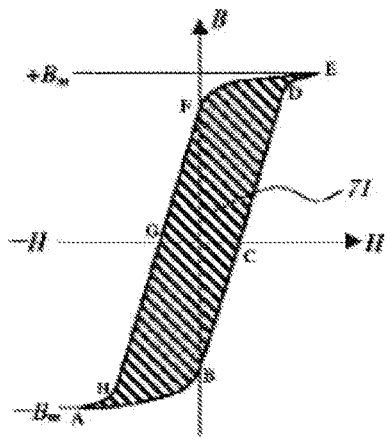
FIG. 7 is the working area diagram of the magnetic core in a self-excitation push-pull converter.
Figure 8:
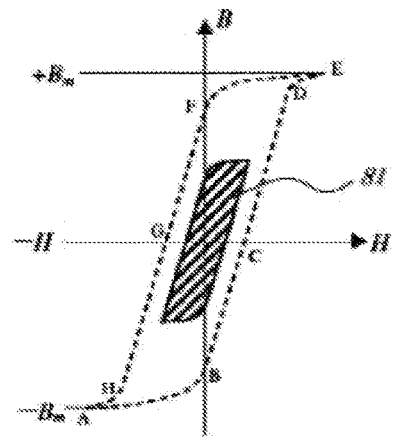
FIG. 8 is the working area diagram of the magnetic core corresponding to the main section in this invention in a self-excitation push-pull converter.

When the output current is 5% of the full load 200 mA, or 10 mA, the efficiency is tested also using the circuit in FIG. 6, and in conjunction with Table 1, the measured data are as shown in Table 5:

TABLE 5

|  | Input current Iin | Input voltage Vin | Output current Iout | Output voltage Vout | Output ripple (p-p value) | Efficiency (Calculated value) |
|---|---|---|---|---|---|---|
| Actually measured with existing technology | 28.4 mA | 5.060 V | 9.96 mA | 5.487 V | 135.7 mV | 38.03% |
| Actually measured with the transformer made as per embodiment 2 of this invention in the circuit | 17.5 mA | 5.066 V | 9.95 mA | 5.478 V | 54.3 mV | 61.48% |

Note:
the output ripple is tested with a full load of 200 mA.

Obviously, after using this invention, the efficiency of the self-excitation push-pull converter when working with low load has been substantially increased, by (61.48%−38.03%)= 23.45%.

Obviously, after using the self-excitation push-pull converter of this invention, the output ripple of the self-excitation push-pull converter when working with light load has been substantially reduced, by 81.4 mV, or 59.9%.

Further, tests were made over the full range from low load to full load at steps of 5%, and at steps of 10% when the load rate is over 40%, records were made in Table 6:

TABLE 6

| Load rate | Product | Iin (mA) | Vin (V) | Iout (mA) | Vout (V) | Efficiency | Increase of efficiency |
|---|---|---|---|---|---|---|---|
| 5% | Existing technology | 28.4 | 5.060 | 9.96 | 5.487 | 38.03% | 23.45% |
|  | This invention | 17.5 | 5.066 | 9.95 | 5.478 | 61.48% |  |
| 10% | Existing technology | 40.0 | 5.045 | 20.00 | 5.424 | 53.76% | 20.58% |
|  | This invention | 28.9 | 5.052 | 20.00 | 5.427 | 74.34% |  |
| 15% | Existing technology | 51.1 | 5.031 | 30.10 | 5.381 | 63.00% | 16.83% |
|  | This invention | 40.3 | 5.037 | 30.10 | 5.384 | 79.84% |  |
| 20% | Existing technology | 62.7 | 5.016 | 40.00 | 5.341 | 67.93% | 15.12% |
|  | This invention | 51.4 | 5.022 | 40.10 | 5.346 | 83.05% |  |
| 25% | Existing technology | 73.7 | 5.002 | 50.00 | 5.305 | 71.95% | 12.70% |
|  | This invention | 62.8 | 5.008 | 50.10 | 5.314 | 84.65% |  |
| 30% | Existing technology | 85.1 | 4.987 | 59.90 | 5.269 | 74.37% | 11.67% |
|  | This invention | 73.7 | 4.994 | 60.00 | 5.278 | 86.04% |  |
| 35% | Existing technology | 96.3 | 4.973 | 69.90 | 5.236 | 76.42% | 10.31% |
|  | This invention | 85.0 | 4.978 | 70.00 | 5.243 | 86.74% |  |
| 40% | Existing technology | 107.6 | 4.960 | 79.70 | 5.202 | 77.68% | 9.58% |
|  | This invention | 96.1 | 4.965 | 79.90 | 5.211 | 87.26% |  |
| 50% | Existing technology | 130.1 | 4.931 | 99.70 | 5.138 | 79.85% | 8.02% |
|  | This invention | 118.5 | 4.936 | 99.90 | 5.145 | 87.87% |  |
| 60% | Existing technology | 153.8 | 4.900 | 120.50 | 5.073 | 81.11% | 7.21% |
|  | This invention | 141.5 | 4.907 | 120.70 | 5.081 | 88.33% |  |
| 70% | Existing technology | 174.9 | 4.873 | 139.40 | 5.013 | 81.99% | 6.31% |
|  | This invention | 162.7 | 4.879 | 139.60 | 5.021 | 88.30% |  |
| 80% | Existing technology | 199.8 | 4.847 | 161.80 | 4.950 | 82.70% | 5.60% |
|  | This invention | 187.4 | 4.845 | 161.90 | 4.952 | 88.30% |  |
| 90% | Existing technology | 220.0 | 5.030 | 180.00 | 5.131 | 83.46% | 4.84% |
|  | This invention | 208.2 | 5.032 | 180.20 | 5.134 | 88.31% |  |
| 100% | Existing technology | 242.0 | 5.024 | 198.00 | 5.094 | 82.96% | 5.04% |
|  | This invention | 229.1 | 5.025 | 199.00 | 5.091 | 88.00% |  |

Figure 14:
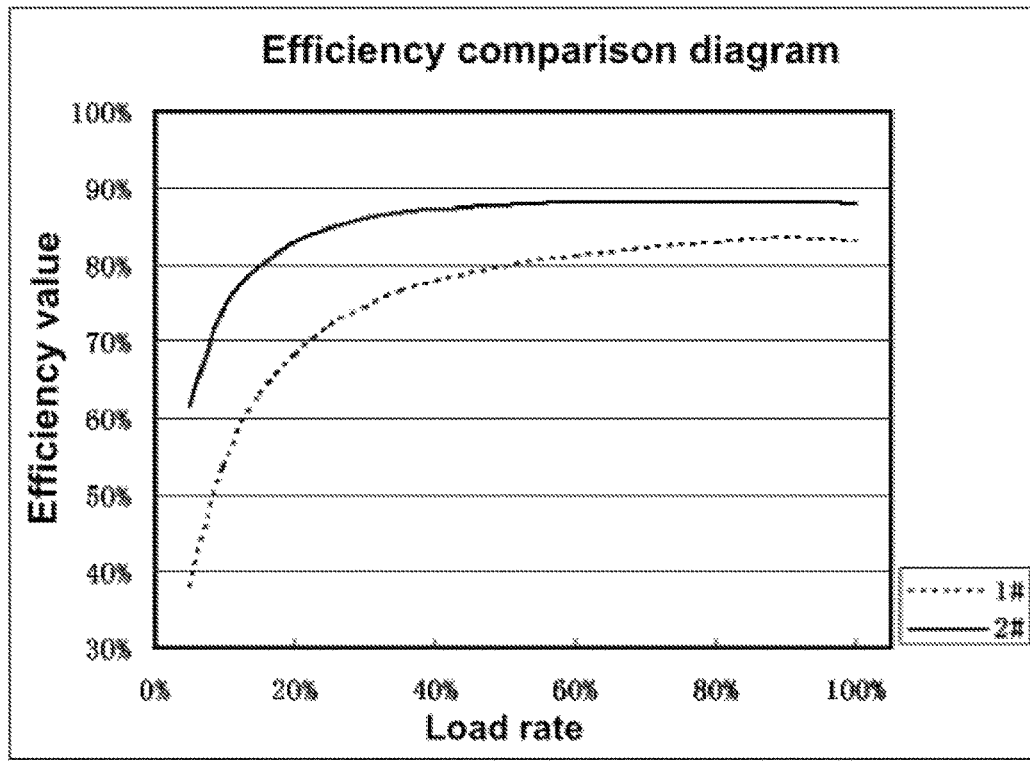
FIG. 14 is the efficiency comparison diagram of embodiment 2 of this invention with the magnetic core of existing technology fitted into circuit.

Obviously, the conversion efficiency when the self-excitation push-pull converter of this invention is used has been obviously increased in the whole range from low load and full load, a comparison chart is made using software, refer to FIG. 14, in which 2# is the conversion efficiency curve of the self-excitation push-pull converter after using this invention, and curve 1# is the conversion efficiency curve of the self-excitation push-pull converter with the existing technology.

The no-load current of the self-excitation push-pull converter has also been reduced from 18.0 mA of the existing technology to 6.9 mA of the self-excitation push-pull converter of this invention, i.e. the no-load loss has reduced from 90 mW of the existing technology to 34.5 mW of this invention. At the same time, the working frequency has increased from 97.3 kHz with the existing technology to 139 kHz in embodiment 2 of this invention. The resulted benefit is reducing the number of turns of the primary side coils $N_{P1}$ and $N_{P2}$ respectively from 20 to 7, reducing the work time in winding, and also avoiding mistakes in memorizing.

It can be seen from Table 6 that, at a load of 10%, i.e. an output current of 20 mA, this invention still has an efficiency of 74%, if the magnetic core size is reduced to design a specific micro power DC/DC converter, the efficiency can be further improved.

Embodiment 3

Figures 1, 15:
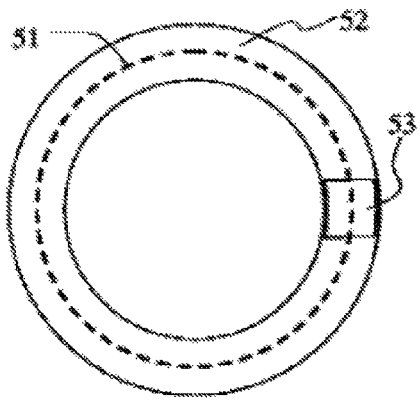
Figures 2, 15:
Figures 3, 15:
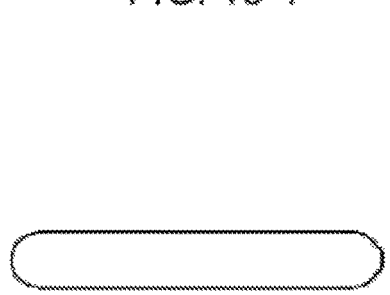
Figures 4, 15:
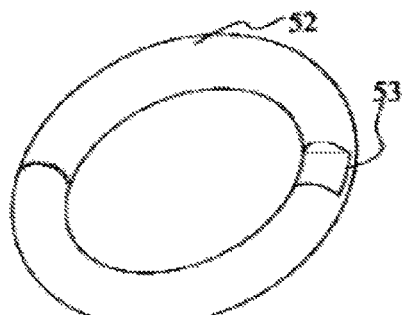

FIG. 15-1 to FIG. 15-3 show the transformer magnetic core used in the self-excitation push-pull converter of embodiment 3 of this invention, FIG. 15-1 is the front view of the transformer magnetic core used in embodiment 3 of this invention; FIG. 15-2 is the side view of the transformer magnetic core used in embodiment 3 of this invention; FIG. 15-3 is the top view of the transformer magnetic core used in embodiment 3 of this invention; and FIG. 15-4 is the 3D view of the transformer magnetic core used in embodiment 3 of this invention. There is also a small partial section 53 with a small area of the magnetic core, the main section 52, and the length of the partial section is very short. The working principle is identical to that in the above description of the invention and in embodiments 1 to 2, so it will not be repeated here.

Embodiment 4

Figures 1, 16:
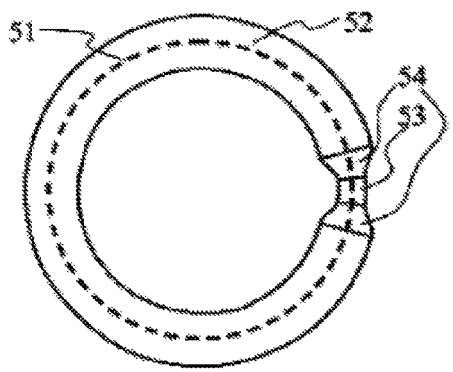
Figures 2, 16:
Figures 3, 16:
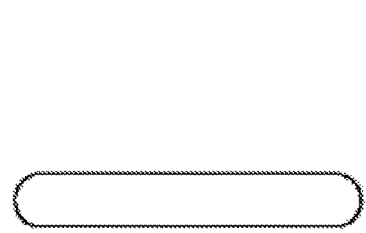
Figures 4, 16:
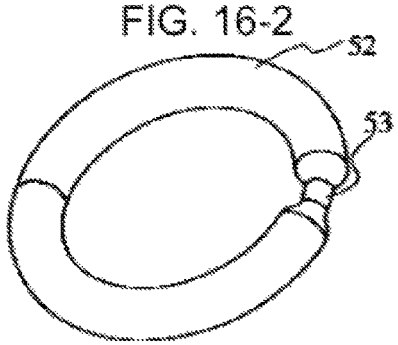

FIG. 16-1 to FIG. 16-4 show the transformer magnetic core used in the self-excitation push-pull converter in embodiment 4 of this invention, FIG. 16-1 is the front view of the magnetic core in embodiment 4 of this invention; FIG. 16-2 is the side view of the magnetic core in embodiment 4 of this invention; FIG. 16-3 is the top view of the magnetic core in embodiment 4 of this invention; and FIG. 16-4 is the 3D view of the magnetic core in embodiment 4 of this invention. As there is also a small partial section 53 with smaller sectional area of magnetic core, the main section 52, and the feature of further improvement of embodiment 4: a transition section 54 exists between the main section and partial section, the transition section 54 can be equivalent as part of the partial section, the transition section 54 is provided to facilitate demoulding of the magnetic core after magnetic powder moulding, and actually it is a further improvement to embodiment 1 in FIGS. 9-1 to 9-4.

Similarly, it is required that the length of the partial section and the transition section 54 be short. The working principle of the whole power flow is identical to that in the above description of the invention and in embodiments 1 to 2, so it will not be repeated here. Due to the presence of transition section 54, the length of partial section 53 can be zero, and in this case, there is still a section with the minimum sectional area, with a length close to zero, but the purpose of the invention can still be realized.

Embodiment 5

Figures 1, 17:
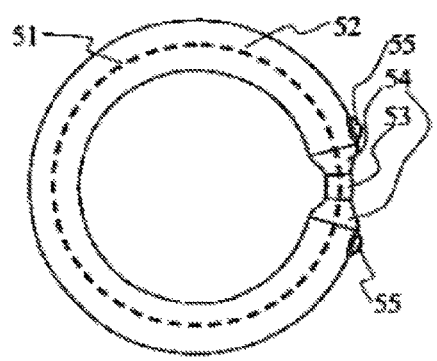
Figures 2, 17:
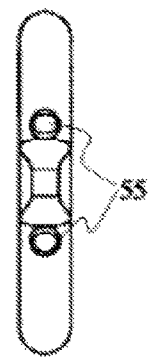
Figures 3, 17:
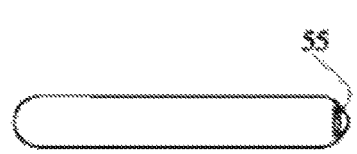
Figures 4, 17:
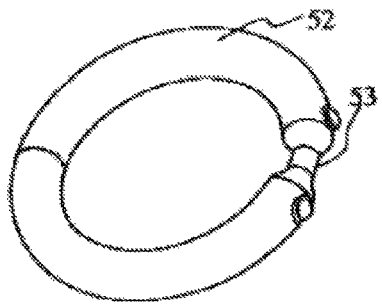

FIG. 17-1 to FIG. 17-4 show the transformer magnetic core used in the self-excitation push-pull converter in embodiment 5 of this invention, FIG. 17-1 is the front view of the magnetic core in embodiment 5 of this invention; FIG. 17-2 is the side view of the magnetic core in embodiment 5 of this invention; FIG. 17-3 is the top view of the magnetic core in embodiment 5 of this invention; and FIG. 17-4 is the 3D view of the magnetic core in embodiment 5 of this invention.

The improvement feature of embodiment 5 of this invention is: on the basis of embodiment 4, two or more salient points 55 are added on the main section, to prevent the wire on the main section from sliding to the partial section, and salient points 55 can be at any position on the main section. Another function of salient points 55 is to determine the zone of different windings, to prevent their mutual intersection.

As there is also a small partial section 53 with smaller sectional area of magnetic core, the main section 52, and the transition section 54 between the main section and partial section, the transition section 54 can be equivalent as part of the partial section, the transition section 54 is provided to facilitate demoulding of the magnetic core after magnetic powder moulding, and actually it is a further improvement to embodiment 4 in FIGS. 16-1 to 16-4.

Similarly, it is required that the length of the partial section and the transition section 54 be short. The working principle of the whole power flow is identical to that in the above description of the invention and in embodiments 1 to 2, so it will not be repeated here. Due to the presence of transition section 54, the length of partial section 53 can be zero, and the purpose of the invention can still be realized.

Embodiment 6

Figures 1, 18:
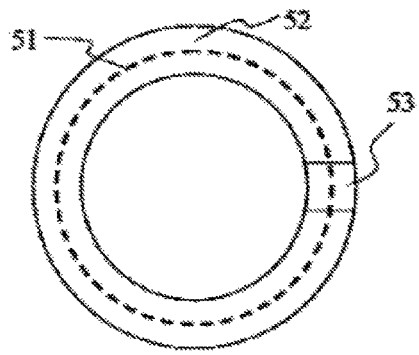
Figures 2, 18:
Figures 3, 18:
Figures 4, 18:
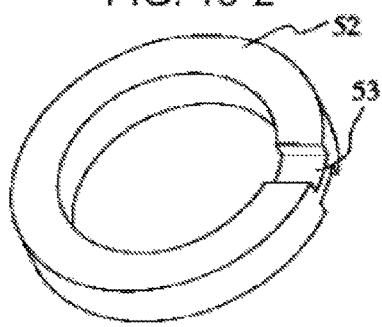

FIG. 18-1 to FIG. 18-4 show the transformer magnetic core used in the self-excitation push-pull converter of embodiment 6 of this invention, FIG. 18-1 is the front view of the magnetic core used in embodiment 6 of this invention; FIG. 18-2 is the side view of the magnetic core used in embodiment 6 of this invention; FIG. 18-3 is the top view of the magnetic core used in embodiment 6 of this invention; and FIG. 18-4 is the 3D view of the magnetic core used in embodiment 6 of this invention. There is also a small partial section 53 with a small area of the magnetic core, the main section 52, and the length of the partial section is very short. The working principle of the circuit of the whole self-excitation push-pull converter is identical to that in the above description of the invention and in embodiments 1 to 2, so it will not be repeated here.

Embodiment 7

Figures 1, 19:
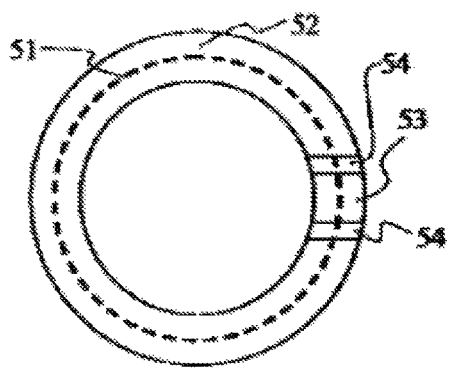
Figures 2, 19:
Figures 3, 19:
Figures 4, 19:
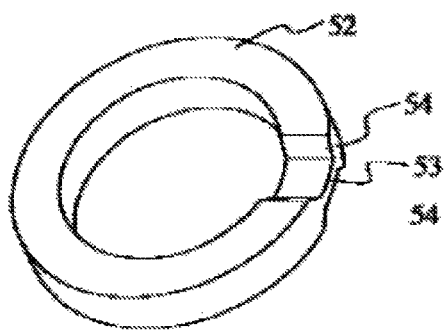

FIG. 19-1 to FIG. 19-4 show the transformer magnetic core used in the self-excitation push-pull converter of embodiment 7 of this invention, FIG. 19-1 is the front view of the magnetic core used in embodiment 7 of this invention; FIG. 19-2 is the side view of the magnetic core used in embodiment 7 of this invention; FIG. 19-3 is the top view of the magnetic core used in embodiment 7 of this invention; and FIG. 19-4 is the 3D view of the magnetic core used in embodiment 7 of this invention. There is also a small partial section 53 with a small area of the magnetic core, and the main section 52.

The technical feature of the magnetic core used in embodiment 7: a transition section 54 exists between the main section and partial section, the transition section 54 can be equivalent as part of the partial section, the transition section 54 is provided to facilitate demoulding of the magnetic core after magnetic powder moulding, and actually it is a further improvement to embodiment 6 in FIGS. 18-1 to 18-4. Due to the presence of transition section 54, the length of partial section 53 can be zero, and the purpose of the invention can still be realized.

The working principle of the self-excitation push-pull converter is identical to that in the above description of the invention and in embodiments 1 to 2, so it will not be repeated here.

Similarly, when the magnetic core adopted in the above-mentioned 7 embodiments is used in transformer B1 in the Jensen circuit as shown in FIG. 1-2, it can also increase the conversion efficiency of the Jensen circuit in the whole range from light load to full load, reduce the number of winding turns of the transformer B1 and increase the working frequency of the circuit.

Embodiment 8

Figures 1, 20:
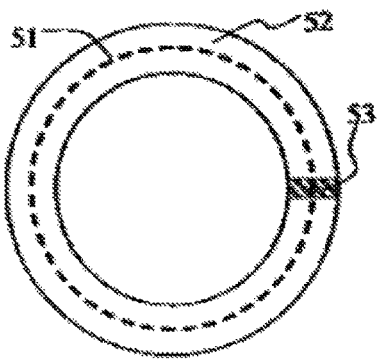
Figures 2, 20:
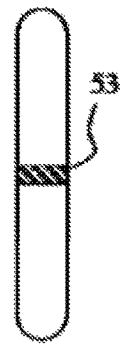
Figures 3, 20:
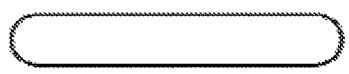
Figures 4, 20:
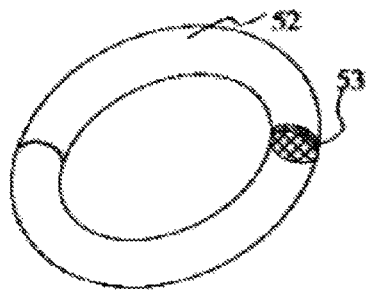

FIG. 20-1 to FIG. 20-4 show the transformer magnetic core used in the self-excitation push-pull converter in embodiment 8 of this invention, FIG. 20-1 is the front view of the magnetic core in embodiment 8 of this invention; FIG. 20-2 is the side view of the magnetic core in embodiment 8 of this invention; FIG. 20-3 is the top view of the magnetic core in embodiment 8 of this invention; and FIG. 20-4 is the 3D view of the magnetic core in embodiment 8 of this invention. There is a magnetic column of an equal sectional area and made of a different material, with a length less than one eighth of the total magnetic path length, and a sectional area below 80% and above 4% of the sectional area of the main section but over 0.02 mm, taken as part of 0.5 mm. Actually, it is a circular magnetic chip because it is very thin, is pressed to a ring base in the mould to make magnetic rings, and then sintered into a magnetic core as shown in FIG. 20-4. A circular magnetic chip of 0.02 mm represents the limit of the current machining process, in fact, the purpose of this invention can be better realized with a size below 0.02 mm.

When excited by the same magnetic field, the magnetic column 53 is more likely to become saturated than the main section 52, so the magnetic column 53 is the partial section, as shown in the shadow part in FIG. 20-1 to FIG. 20-4. The working principle of the self-excitation push-pull converter in embodiment 8 is identical to that in the above description of the invention and in embodiments 1 to 2, and it can also realize the purpose of this invention, so it will not be repeated here.

Similarly, when the magnetic core adopted in the above-mentioned 8 embodiments is used in transformer B1 in the Jensen circuit as shown in FIG. 1-2 and the magnetic saturation transformers in Jensen circuit in different literatures, it can also increase the conversion efficiency of the Jensen circuit in the whole range from light load to full load. And it can also reduce the number of turns of the transformer B1 and increase the working frequency of the circuit.

The above are only preferable embodiments of this invention, and it should be pointed out that, the preferable embodiments above should not be regarded as restrictions to this invention, and the scope of protection for this invention shall be that defined by the claims. For ordinary technical personnel in this technological field, within the essence and scope of this invention, some improvements and decorations can be made, and such improvements and decorations shall also be covered in the scope of protection of this invention. For example, the partial section and main section can be embodied by using magnetic rings of sectional area in different geometric shapes, or the profile of the whole magnetic core as aforesaid can be embodied with a square or elliptic magnetic ring.

What is claimed is:

1. A self-excitation push-pull converter, comprising a first transistor and a second transistor, each with an emitter and a collector where the emitter of the first transistor is connected to the emitter of the second transistor, and a transformer with a magnetic core and two primary side coils each having a first end and a second end, wherein the first ends of the two primary side coils are connected to each other to form a voltage input and the second ends of the two primary side coils are connected to the collector of the first transistor and the collector of the second transistor, respectively, and the magnetic core has a closed magnetic path and comprises a main section and at least one partial section, said partial section reaching magnetic saturation before said main section when excited under a same increasing magnetic field,
wherein said partial section has a sectional area of a size less than 80% and greater than 4% of a sectional area of said main section,
wherein a length of said partial section is negatively correlated to a ratio of the sectional area of said main section to the sectional area of said partial section.

2. The self-excitation push-pull converter according to claim 1, wherein with said main section is wound with a coil, while said partial section is not wound with any coil.

3. The self-excitation push-pull converter according to claim 1, wherein said main section and said partial section are made of an identical material.

4. The self-excitation push-pull converter according to claim 1, wherein there is a plurality of said partial sections, and the sum of the lengths of said closed magnetic path, and said partial sections each has a sectional area of a size less than 80% and greater than 4% of that of said main section.

5. The self-excitation push-pull converter according to claim 3, wherein said partial section has a length of over 0.05 mm.

6. The self-excitation push-pull converter according to claim 1, wherein said main section and said partial section are made of different materials.

7. The self-excitation push-pull converter according to claim 6, wherein there is one or more said partial section and the sum of the lengths of said partial sections is less than one eighth of the length of said closed magnetic path.

8. The self-excitation push-pull converter according to claim 7, wherein feature said partial sections each has a length of over 0.02 mm.

9. The self-excitation push-pull converter according to claim 1, said magmatic core further comprises a transition section to facilitate demoulding between said main section and said partial section.

10. The self-excitation push-pull converter according to claim 1, wherein there are two or more salient points on said main section.

11. The self-excitation push-pull converter according to claim 1, wherein a proportion of the length of the partial section in a length of a total magnetic path of the magnetic core is y/(k-1), wherein y is an expected value, and k is the ratio of the sectional area of the main section to the sectional area of the partial section.

* * * * *